US012670146B2

(12) United States Patent
Chaturvedi et al.

(10) Patent No.: US 12,670,146 B2
(45) Date of Patent: Jun. 30, 2026

(54) MONITORING AND ALERTING MECHANISMS

(71) Applicant: Palantir Technologies Inc., Denver, CO (US)

(72) Inventors: Aditya Chaturvedi, San Francisco, CA (US); Austin Czarnecki, New Malden (GB); Alexander Martino, Avon, CO (US); Benjamin Duffield, New York, NY (US); Gokcan Ozakdag, London (GB); Natacha Gabbamonte, Brooklyn, NY (US)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 18/890,535

(22) Filed: Sep. 19, 2024

(65) Prior Publication Data

US 2025/0053556 A1 Feb. 13, 2025

Related U.S. Application Data

(63) Continuation of application No. 18/077,451, filed on Dec. 8, 2022, now Pat. No. 12,124,428.

(60) Provisional application No. 63/357,837, filed on Jul. 1, 2022.

(51) Int. Cl.
*G06F 16/23* (2019.01)
*G06F 16/25* (2019.01)

(52) U.S. Cl.
CPC ........ *G06F 16/2358* (2019.01); *G06F 16/258* (2019.01)

(58) Field of Classification Search
CPC ........................... G06F 16/2358; G06F 16/258
See application file for complete search history.

(56) References Cited

U.S. PATENT DOCUMENTS

| | | | |
|---|---|---|---|
| 10,748,072 B1 | 8/2020 | Seeger et al. | |
| 2003/0225651 A1 | 12/2003 | Chen | |
| 2004/0128025 A1 | 7/2004 | Deal | |
| 2006/0282342 A1* | 12/2006 | Chapman ............. | G06Q 10/087 705/28 |

(Continued)

OTHER PUBLICATIONS

Extended European Search Report dated Jun. 14, 2023, issued in related European Patent Application No. 22214938.7 (9 pages).

(Continued)

*Primary Examiner* — Tarek Chbouki
(74) *Attorney, Agent, or Firm* — Sheppard Mullin Richter & Hampton LLP

(57) ABSTRACT

Computing systems methods, and non-transitory storage media are provided for receiving a monitoring request. The monitoring request includes one or more entities or attributes to be monitored, one or more rules to be evaluated with respect to the entities or attributes, and one or more downstream actions to be selectively triggered based on the evaluation. Next, data regarding the entities or the attributes is obtained. Next, a log is generated. The log includes changes or updates, relative to a previous iteration, of the entities or the attributes. The changes or updates correspond to the rules. Next, the changes or the updates are evaluated against the one or more rules and based on the log. Next, one or more actions are selectively implemented based on the evaluation of the changes or the updates.

20 Claims, 14 Drawing Sheets

(56) References Cited

U.S. PATENT DOCUMENTS

| | | | |
|---|---|---|---|
| 2008/0209029 A1 | 8/2008 | Bhattacharya et al. | |
| 2009/0024940 A1* | 1/2009 | Zeringue | G06F 3/0481 |
| | | | 715/763 |
| 2010/0030777 A1 | 2/2010 | Panwar et al. | |
| 2010/0241467 A1 | 9/2010 | Saw et al. | |
| 2010/0257116 A1* | 10/2010 | Mehta | G06Q 10/063 |
| | | | 707/751 |
| 2014/0100878 A1* | 4/2014 | Adams | G16H 10/60 |
| | | | 705/3 |
| 2014/0372406 A1* | 12/2014 | Hoffman | G06F 16/21 |
| | | | 707/714 |
| 2016/0294649 A1 | 10/2016 | Russell et al. | |
| 2018/0349257 A1 | 12/2018 | Bhattacharjee et al. | |
| 2020/0104304 A1 | 4/2020 | Oliner et al. | |
| 2020/0143315 A1 | 5/2020 | Marquette | |
| 2020/0151654 A1 | 5/2020 | Bradley | |
| 2020/0364662 A1* | 11/2020 | Avery, Jr. | G06Q 10/0875 |
| 2021/0118054 A1 | 4/2021 | Turner et al. | |
| 2021/0224736 A1 | 7/2021 | Abrahamson et al. | |
| 2021/0400195 A1* | 12/2021 | Adato | G06Q 30/0201 |
| 2022/0083954 A1 | 3/2022 | Starostenko | |
| 2022/0157063 A1 | 5/2022 | Bronicki | |
| 2023/0079388 A1* | 3/2023 | Fisher | G06T 3/60 |
| | | | 382/103 |
| 2023/0368624 A1 | 11/2023 | Bronicki et al. | |

OTHER PUBLICATIONS

Non-Final Office Action dated Nov. 24, 2023, issued in related U.S. Appl. No. 18/077,451 (11 pages).

* cited by examiner

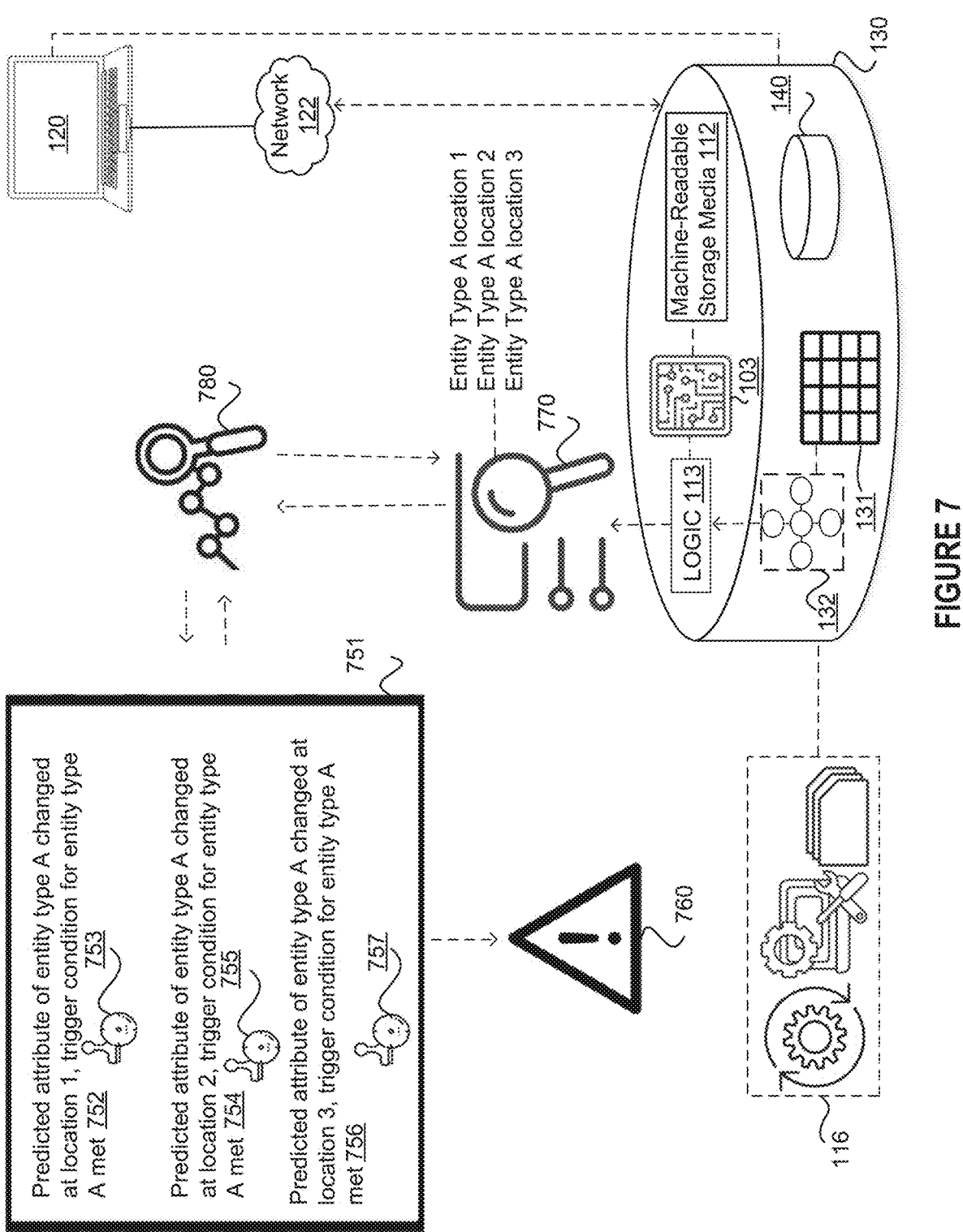

Predicted attribute of entity type A changed at location 1, trigger condition for entity type A met 752    753

Predicted attribute of entity type A changed at location 2, trigger condition for entity type A met 754    755

Predicted attribute of entity type A changed at location 3, trigger condition for entity type A met 756    757

Entity Type A location 1
Entity Type A location 2
Entity Type A location 3

Machine-Readable Storage Media 112

LOGIC 113

FIGURE 7

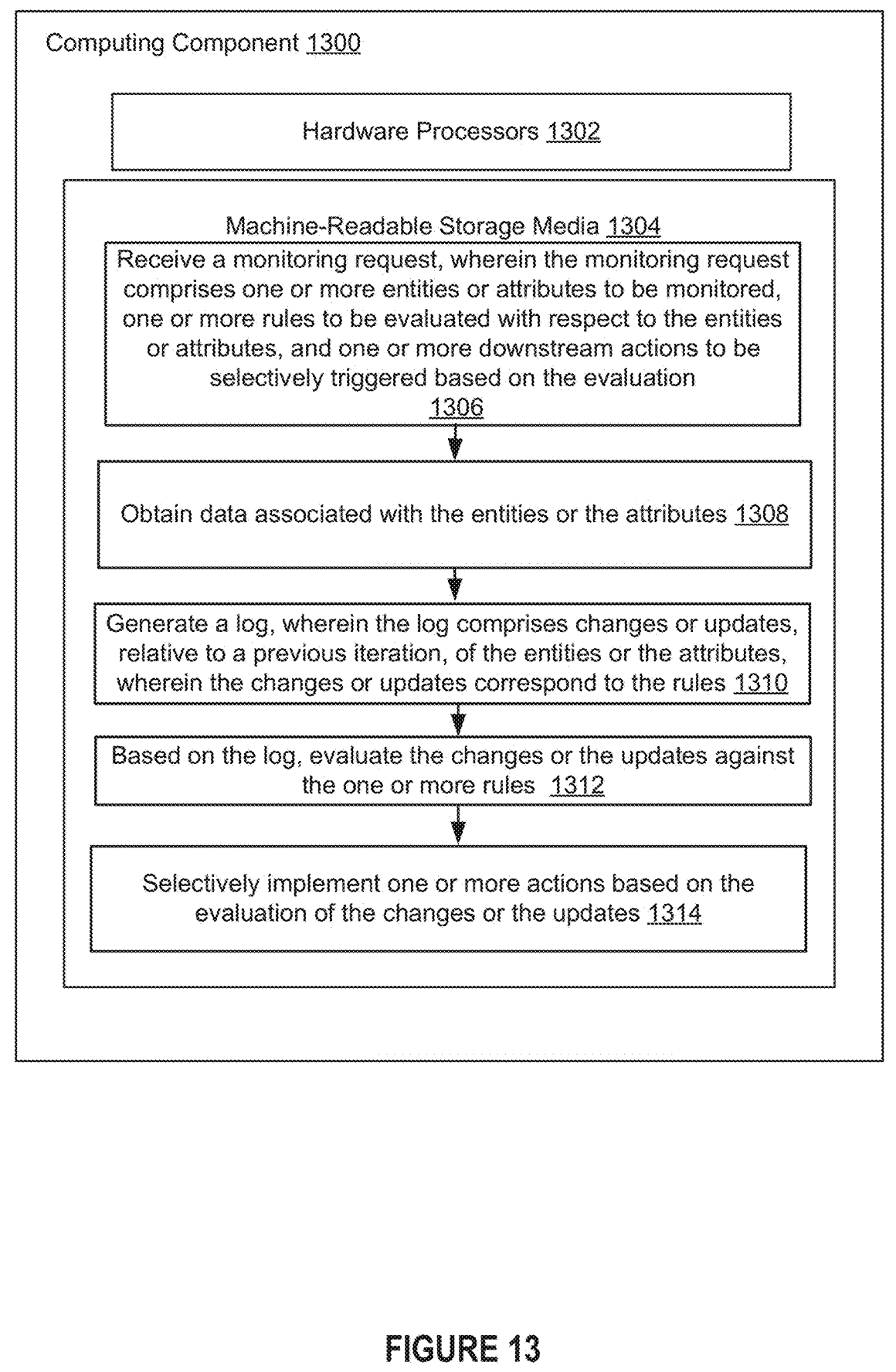

Computing Component 1300

Hardware Processors 1302

Machine-Readable Storage Media 1304

Receive a monitoring request, wherein the monitoring request comprises one or more entities or attributes to be monitored, one or more rules to be evaluated with respect to the entities or attributes, and one or more downstream actions to be selectively triggered based on the evaluation
1306

Obtain data associated with the entities or the attributes 1308

Generate a log, wherein the log comprises changes or updates, relative to a previous iteration, of the entities or the attributes, wherein the changes or updates correspond to the rules 1310

Based on the log, evaluate the changes or the updates against the one or more rules 1312

Selectively implement one or more actions based on the evaluation of the changes or the updates 1314

FIGURE 13

Processor(s)
1404

Network
Interface(s)
1418

Bus
1402

Main
Memory
1406

ROM
1408

Storage
1410

Display
1412

Input
Device(s)
1414

Cursor
Control
1416

MONITORING AND ALERTING MECHANISMS

CROSS-REFERENCE TO RELATED APPLICATION

This application is a continuation of U.S. patent application Ser. No. 18/077,451, filed Dec. 8, 2022, which claims the benefit under 35 U.S.C. 119 (e) of U.S. Provisional Application No. 63/357,837, filed Jul. 1, 2022, the content of which is hereby incorporated in its entirety.

FIELD OF THE INVENTION

This disclosure relates to approaches of monitoring and alerting within a database or a datastore, or even before data is ingested or is synchronized into a database or a datastore.

BACKGROUND

Despite rapidly expanding amounts of data, the ability to actually fully leverage or harness the data remains compromised due to limitations of monitoring. In particular, the ability to perform more complex monitoring operations quickly remains a conundrum in computing. Some specific deficiencies in this field include constraints on types or formats of data, or combinations thereof, that can feasibly or efficiently be monitored, types of conditions or scenarios for which monitoring can feasibly or efficiently be performed, and a limited ability to continuously monitor for new events efficiently. For example, current techniques may be inadequate in monitoring when data sources from which underlying data originates are of different types or formats.

SUMMARY

Various examples of the present disclosure can include computing systems, methods, and non-transitory computer readable media configured to perform: receiving a monitoring request, wherein the monitoring request comprises one or more entities or attributes to be monitored, one or more rules to be evaluated with respect to the entities or attributes, and one or more actions to be selectively triggered based on the evaluation; obtaining data associated with the entities or the attributes; generating a log, wherein the log comprises changes or updates, relative to a previous iteration, of the entities or the attributes, wherein the changes or updates correspond to the rules; based on the log, evaluating the changes or the updates against the one or more rules; and selectively implementing one or more actions based on the evaluation of the changes or the updates.

In some examples, the data comprises any two formats selected from: an object-oriented format, a time series format, a relational or tabular format, and a media format comprising an audio, video, image, or combination thereof.

In some examples, the log comprises respective timestamps corresponding to the changes or the updates, the timestamps indicating times at which the changes or the updates occurred within underlying data.

In some examples, instructions that, when executed by one or more processors of the computing system, cause the computing system to perform: further cause the one or more processors to perform: in response to obtaining data associated with the entities or the attributes, converting a subset of the obtained data in a non-time-series format to a time-series format.

In some examples, the log comprises updates to the attributes, wherein: the log comprises updates to the attributes; the attributes comprise an aggregate property over entities of a common entity type; the rules define permitted upper or lower bounds of the attributes. or the attributes; and the evaluating of the changes or the updates against the one or more rules comprises determining that an action is to be implemented if the attributes fall outside of the upper or lower bounds.

In some examples, the one or more actions comprise an alert or a notification to an entity that transmitted the monitoring request.

In some examples, the one or more actions comprise: obtaining additional information regarding the entities or the attributes; generating a second log, wherein the second log comprises second changes or second updates, relative to the log, of the entities or the attributes, wherein the second changes or second updates correspond to the rules; based on the second log, evaluating the second changes or the second updates against the one or more rules; and selectively implementing one or more second actions based on the evaluation of the second changes or the second updates.

In some examples, the one or more actions comprise: obtaining additional information regarding second entities or second attributes dependent upon or related to the entities or the attributes; generating a second log, wherein the second log comprises second changes or second updates, relative to a previous iteration, of the second entities or second attributes; based on the second log, evaluating the second changes or the second updates against the one or more second rules associated with the second entities or the second attributes; and selectively implementing one or more second actions based on the evaluation of the second changes or the second updates.

In some examples, the attributes are indicative of a rate, degree, extent, amount, or frequency of change, or a variance of a property of an entity; and the rules are associated with a permitted rate, degree, extent, amount, or frequency of change, or a permitted variance.

In some examples, the one or more actions comprise performing a modification or transformation on an entity or a link of the entity within underlying data that is associated with the changes or the updates.

These and other features of the computing systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIG. 1 may also be applicable to any of FIGS. 2-13 and vice versa.

FIG. 7 illustrates an example operation of performing monitoring on predicted data.

FIG. 13 illustrates a flowchart of an example method consistent with FIGS. 1-12, embodied in a computing component.

DETAILED DESCRIPTION

In some current implementations, relevant data may be exported, for example, from a source such as a database, in order to perform monitoring functions. In some current implementations, data may be queried to determine whether some criteria has been met. Even running a query without fully exporting or transferring data to a target database or other data storage may result in load on a search process or search index, affect performance of querying and other processes, and entail frequent queries in order to be reliable. After export, one or more data pipelines may transform the data into one or more different formats, such as an object-oriented format, to facilitate monitoring. These implementations entail additional infrastructure and time consumption. These shortcomings of current implementations are a testament that improvements in monitoring of data, and other downstream actions, would not only reduce computing infrastructure and time, but also augment and enrich current data operations, thereby more fully harnessing data. Current implementations may also entail harmonizing data formats to express monitoring criteria in a single language for different types of criteria, data formats, or data types, which further consumes processing loads.

Therefore, to address these shortcomings, a technical effect is achieved by permitting the expression of monitoring criteria in terms that are semantically native to a particular data type, without requiring harmonization, thereby increasing versatility of expressions and criteria against which monitoring is performed, while reducing processing load. One example of different criteria may include, a ship observed in satellite imagery entering a geographic bounding box, or when red cars have a latest engine temperature reading above some threshold. In this aforementioned example, satellite imagery and temperature readings are different data types and/or formats. Nonetheless, the two criteria may be expressed in different terms and/or different languages without harmonizing their expressions.

Additionally, a technical effect is attained by performing monitoring even before data is synchronized to a particular database. By performing monitoring at such an early stage, the monitoring may be made more powerful to support different data types adapted for and/or stored across different source systems or source databases.

Figure 1:
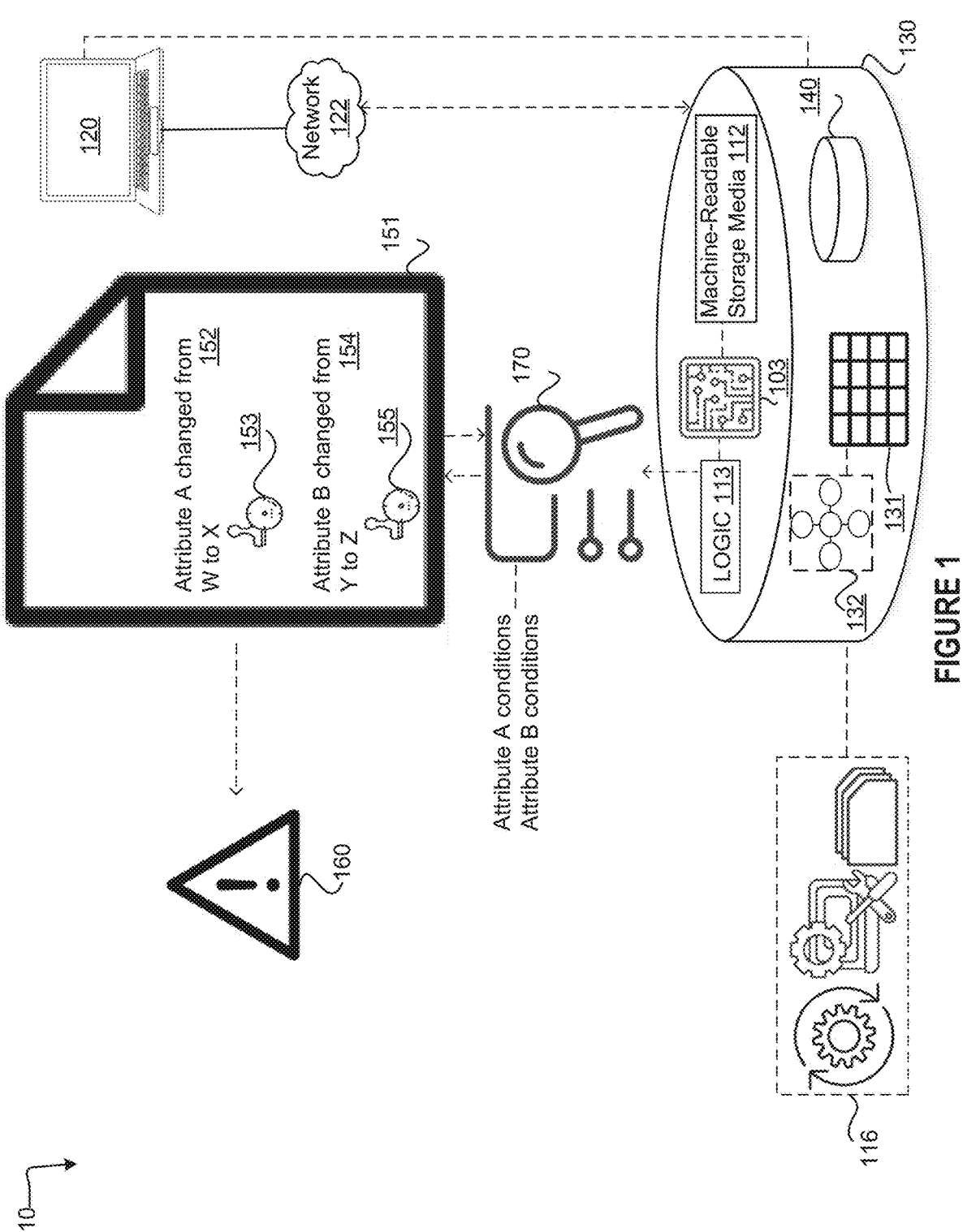
FIG. 1 illustrates an example environment, in accordance with various examples, of a computing system that performs monitoring and selectively performs additional downstream actions based on results of the monitoring.

FIG. 1 illustrates an example environment or scenario (hereinafter "environment"), in accordance with various embodiments, of a computing system within a database or data store (hereinafter "database") that improves existing techniques of monitoring data and/or triggering downstream actions, such as alerting, as a result of the monitoring. The computing system that performs monitoring and triggering of the downstream actions may be directly integrated with the database, thereby obviating a need to export relevant data from the database and perform pipeline operations outside of the database. Directly performing monitoring and downstream actions at the database level not only executes such operations more efficiently and effectively, but also expands the horizons of possibilities of monitoring. For example, additional types and/or formats of data, and combinations thereof, may be supported for monitoring and downstream actions, compared to conventional monitoring mechanisms. The diversity and versatility of supported data types and formats is reflected at least in FIGS. 4-10. Yet another benefit over conventional monitoring mechanisms is that more conditions or scenarios may be defined or established for the monitoring and downstream actions. Another added possibility lies in automatic live monitoring for new events. These and other advantages, which will be further elucidated, constitute a nontrivial technical effect.

FIG. 1 illustrates an example environment 110, in accordance with various embodiments, of a computing system that performs monitoring and other downstream operations, and is integrated with a database 130, more specifically, for example, at a back end of the database 130. In some examples, the back end may correspond to a data access layer. The example environment 110 can include at least one computing device 120. In general, the computing device 120 may be operated by an entity such as a user. The user may submit a request or query through the computing device 120. Such a request or query may relate to operations on or pertaining to the database 130, such as read and/or write operations on the data or a portion thereof within the database 130, transformations, analysis, monitoring, alerting, processing, storing, and/or other operations on the data or a portion thereof. In some examples, the computing device 120 may visually render any outputs generated from the database 130. In general, the user can interact with the database 130 directly or over a network 122, for example, through one or more graphical user interfaces, application programming interfaces, and/or webhooks. The computing device 120 may include one or more processors and memory.

The computing system may include one or more hardware processors 103 which may be configured to perform various operations by interpreting machine-readable instructions, for example, from a machine-readable storage media 112. In some examples, one or more of the hardware processors 103 may be combined or integrated into a single processor, and some or all functions performed by one or more of the hardware processors 103 may not be spatially separated, but instead may be performed by a common processor. The hardware processors 103 may further be connected to, include, or be embedded with logic 113 which, for example, may include protocol that is executed to carry out the functions of the hardware processors 103. In general, the logic 113 may be implemented, in whole or in part, as software that is capable of running on the database 130, and may be read or executed from the machine-readable storage media 112. The logic 113 may include, as nonlimiting examples, parameters, expressions, functions, arguments, evaluations, conditions, and/or code. The logic 113 may include portions that are manually written, composed using a graphical user interface, or automatically generated. Here, in some examples, the logic 113 encompasses functions of or related to monitoring and downstream actions such as alerting. Functions or operations described with respect to the logic 113 may be associated with a single processor or multiple processors. For example, as described with respect to FIG. 11, processing of different object types may be by different processors. Functions or operations within the logic 113 will be subsequently described, following a description of the database 130.

The database 130 may include, or be capable of obtaining, information such as datasets. This information may be ingested, and/or originate from, one or more different data sources or databases. The information may be stored in any format, such as an object oriented format, a relational format, a tabular format, a time-series format, a spreadsheet, or any sensor data format from one or more sensor readings. The information may also be manifested as unstructured data or structured data. Unstructured data may include unstructured text, for example, in document format, and media such as audio, video, and imagery. The information may include qualitative, quantitative, and/or Boolean values or entries. As a non-limiting example, the information may include object-oriented information 132 which may be stored in a back end of the database 130. In some examples, the object-oriented information 132 may have been originally in one or more different formats and converted to an object-oriented format within the database 130. In some examples, the database 130 may be programmed to support multiple inheritance. Metadata of the information may be stored in a relational format, and may be stored at a different layer higher than a layer of the database 130. The metadata may include, for example, a join key, a primary key, or a foreign key constraint or other relationship between two objects. The database 130 may include an index 131 that facilitates searching and alerting. The database 130 may also support additional functionalities 116, besides monitoring and downstream actions such as alerting.

The database 130 may be divided into at least one segment 140. Although one segment 140 is shown for purposes of simplicity, the database 130 may be understood to include multiple segments. As an example, each segment may be particularly tailored to or restricted to storage and management of resources having a particular purpose, categorization, access control constraint, and/or of a particular subject matter. Such segregation of the additional information in different segments may be desirable in scenarios in which access to, dissemination, and/or release of the additional information from one segment is to be determined and managed separately from those resources in other segments, and only specific users may have access to one or more particular segments of resources.

Additionally or alternatively, the database 130 may be divided into multiple segments in order to sequester access to particular information based on access control levels or privileges of each of the segments. For example, each segment may be, or be labelled as, accessible only by persons (e.g., users operating the computing device 120) having one or more particular access control levels or privileges. The demarcation of information within the database 130 into segments, such as the segment 140, provides clear delineations, classification levels and/or access constraints in each of the segments. As an example, one segment may have a classification level of "confidential," while another segment may have a classification level of "top secret." A classification level of a segment may indicate or define a maximum classification level of information or resources that are permitted within the segment. In particular, if one segment has a classification level of "confidential," then information or resources classified up to and including, or, at or below a level of, "confidential" may be permitted to be ingested into the segment while information or resources classified at a level higher than "confidential" may be blocked or restricted from being ingested into the segment. Each segment may be defined by combinations of permissions, for example, "top secret" and "United States" access might be defined for one particular segment, while "top secret," "United States," and "Germany" access might be defined for another particular segment. As a result of partitioning the database 130 into segments, different users and/or monitors may operate on different overlapping subsets of data in the database 130. In some examples, the classification levels may be automatically or manually set.

Additionally or alternatively, instead of dividing the database 130 into segments, a monitor or monitoring process (e.g., encapsulated by the logic 113) may be evaluated on an individual basis for entities based on access control characteristics of the respective entities. For example, if one user only has access to cars produced in the United States while a second user only has access to cars produced in Europe, the monitor or monitoring process may preserve such individual access control characteristics by providing access to only data regarding cars in the United States to one user, while separately providing access to only data regarding cars produced in Europe for the second user. Moreover, the monitor or monitoring process may adhere to arbitrary markings and granular access control characteristics, which may encompass multiple categories, such as any of "top secret," "public," as well as "access to United States" for a first user, and "top secret," as well as "access to United States and Germany" for a second user. For the first user, if a monitoring criteria relates to information outside the United States which is outside the access control privileges of the first user, then such information may be hidden and/or refrained from being shown to the first user.

The logic 113 may be configured to perform monitoring functions by ingesting, obtaining, or receiving input information, evaluating the input information against a rule, and/or against one or more conditions, and/or performing one or more downstream functions based on the evaluation of the input information against the one or more conditions. The input information may be from the database 130 or from a different database. The input information may be manifested in any format, such as a time series format, a non-time series format, an object-oriented format, a relational format, and/or a tabular format. The input information may include plaintext and/or cyphertext. The one or more conditions may include trigger conditions. A trigger condition may be a criterion, or part of a criteria, expression, or rule, that at least partially determines whether a downstream operation, such as alerting, is to be initiated.

As an example, if the input information satisfies a rule or criteria (hereinafter "rule") associated with the one or more conditions, the logic 113 may determine to perform the one or more downstream functions. If the input information fails to satisfy such a rule, then the logic 113 may determine not to perform, or to refrain from performing, the one or more downstream functions. The rule may indicate under what situations the one or more downstream functions are to be performed. The rule may define, specify, or indicate when the logic 113 would generate an alert. As non-limiting examples, the rule may be defined or implemented according to "and," "or," "exclusive or," "not," "nand," "nor," and/or "exclusive nor" logic in combination with the one or more conditions. In some examples, the logic 113 may convert existing data formats if such conversion facilitates the monitoring and/or downstream functions. For example, if a database is limited to data recording different entities without an aggregate property such as a count of the different entities or categories thereof, the logic 113 may compute or derive a time-series from data within the existing database, to determine or more easily access the aggregate property.

As a specific example of "and" logic, the logic 113 may generate an alert if and only if the input information indicates that a car is red and is travelling at greater than a threshold speed for at least a continuous threshold duration. The aforementioned information may be obtained or derived from separate sources. As yet another example, the logic 113 may generate an alert if one of two conditions returns true, but refrain from generating an alert if both conditions return true or neither condition returns true, according to "exclusive or" logic.

Other examples of operation of the logic 113 include generating an alert upon a new entity appearing within a database, a new entity of a specific entity type or having certain attributes appearing, a new entity or existing entity appearing in a specified location or region, a new entity or existing entity appearing within a specified time window, and/or an updated entity that previously did not match certain criteria but has been modified to match that criteria.

In some examples, the determination of whether to generate the alert may be a binary determination in which the only two options are to generate, or to not generate an alert. In other examples, if an alert is to be generated, the alert may be stratified into different levels, for example, based on or correlated with severity or an extent of deviation of the monitored data from permitted ranges, values, and/or fields, and/or an extent of a change from a previous iteration. The different levels may correspond to respective different actions to be taken. Alerts based on severity may include a high severity, a medium severity, and a low severity. For example, a high severity may correspond to a more drastic or urgent action, and may be triggered if an extent of deviation is high and/or an extent of a change compared to a previous iteration is high. A high severity, as a specific example, may entail modifying data or otherwise causing data to be modified in an effort to eliminate or mitigate a future alert. A low severity may correspond to a less drastic or less urgent action, and may be triggered if an extent of deviation is low and/or an extent of a change compared to a previous iteration is low. A low severity, as a specific example, may entail a notification or alert without modifying data or otherwise causing data to be modified. In some examples, an amount of delay of taking an action may be inversely correlated with a severity. In some examples, a duration of time consumed by taking an action may also be inversely correlated with a severity.

Figure 2:
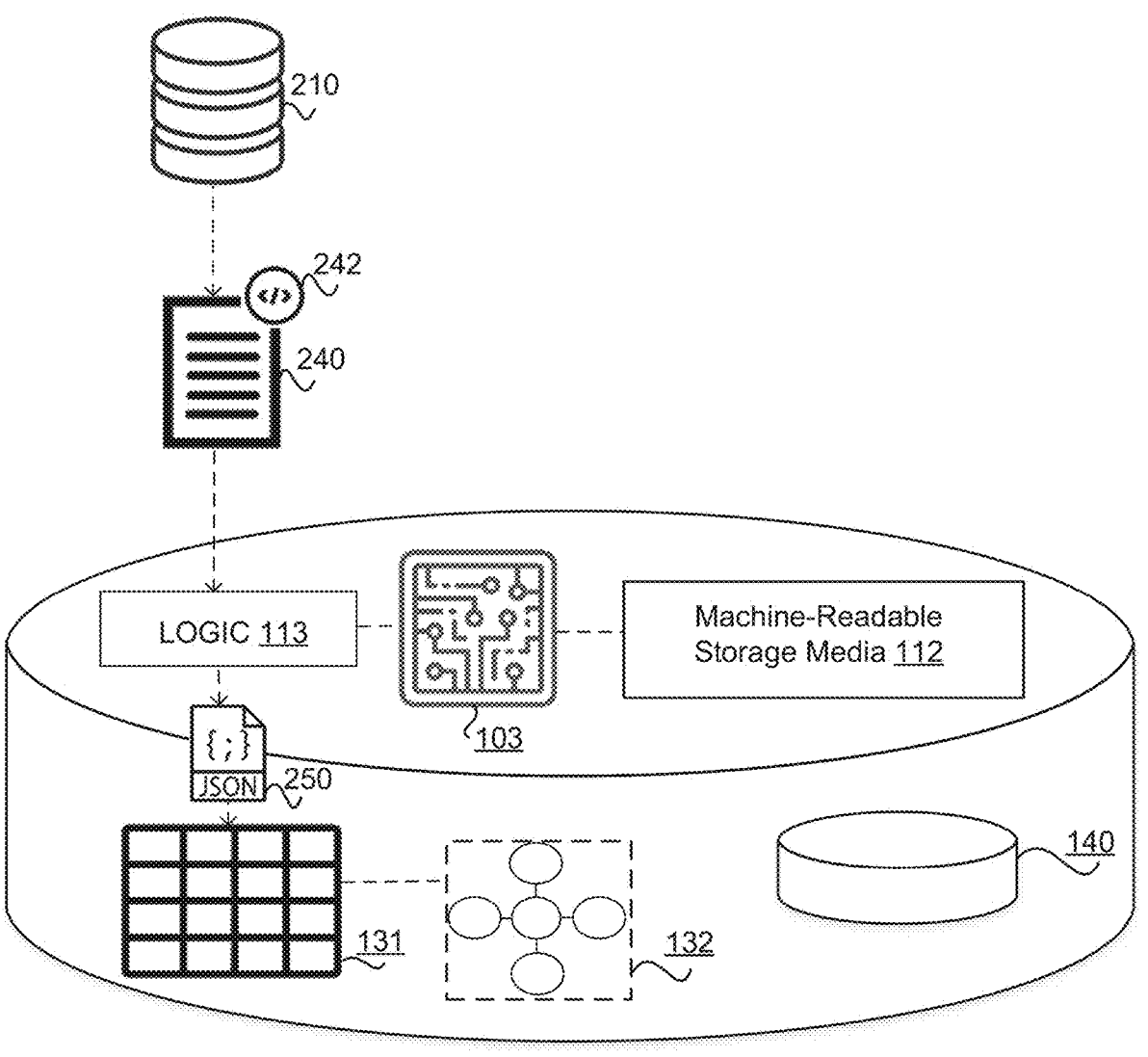
FIG. 2 illustrates an example operation of indexing data in accordance with a specific format or organization.

In some examples, the logic 113 may index at least a subset (e.g., some or all) of the input information to create the index 131. The subset may be relevant to the one or more conditions to be evaluated. In other words, the input information that is indexed may be limited to that which is relevant to the one or more conditions, so that input information which is irrelevant to the one or more conditions may not undergo indexing. The indexing may facilitate retrieval and/or monitoring of a subset of the input information. In some examples, the indexing may be in accordance with a specific format or organization, as illustrated in FIG. 2. This specific format may be specific to, or compatible with, a particular server and/or a distributed architecture. For example, the specified format may include a JavaScript Object Notation (JSON) format. Each portion or attribute of data in the specified format may include a set of keys that correspond to or indicate names of fields or properties, and corresponding values which may encompass strings, numbers, Booleans, dates, arrays of values, geolocations, or other data types. The logic 113 may index any input information according to the specified format. This indexing may encompass a wrapper to convert any input information for storage into the specified format. Specifically, in FIG. 2, input information 240 having metadata 242 may be retrieved from an external data source or an external database 210. The logic 113 may convert a native format of the input information 240, or a relevant portion thereof, into a JSON format or organization 250 for indexing into the database 130 according to the index 131. However, in some implementations, the logic 113 may process information without indexing it.

In some examples, the logic 113 may convert, derive, or generate a converted dataset having a different format from the input dataset to facilitate monitoring. For example, if the input dataset only includes information of separate entities without information regarding the entities, or categories thereof, collectively, the logic 113 may derive an additional dataset, such as in time-series format, which includes collective information regarding the entities. This derivation of the additional dataset may facilitate evaluation of rules or conditions associated with statuses, such as whether the rules or conditions evaluate to true or false.

In order to evaluate against a rule and/or against the one or more conditions, the logic 113 may generate, publish, or obtain a log, such as a change log, which may be specific to the one or more conditions. The log may be customized to memorialize any changes or updates (hereinafter "changes") relevant to the one or more conditions that have occurred between a current iteration or time instance and a previous iteration or time instance. For example, if the one or more conditions only specify a humidity level and a temperature, then the log may memorialize any changes corresponding to the humidity level and the temperature, but exclude other parameters besides the humidity level and the temperature. Therefore, the log may be streamlined to eliminate superfluous information that does not affect whether or not an alert or other downstream action is triggered. The log may encompass a list of changes and one or more respective timestamps or time indications corresponding to the changes. The logic 113 may then determine or evaluate, from the log, whether the changes cause a rule associated with the one or more conditions to be satisfied or met.

Additionally or alternatively, the logic 113 may request and/or receive one or more logs, or equivalents thereof, from an external source, such as, one or more different databases from which the input information has been ingested. If so, when applicable, the logic 113 may convert the received log into a compatible format in order to determine whether the rule, and/or the one or more conditions, have been satisfied or met. Because the log has the relevant information for determining whether the one or more conditions are satisfied, utilizing the log to directly make such determination may eliminate queries to the database 130 or to a different database from where the input information originated, thereby conserving computing resources.

One example implementation of a log 151 is illustrated in FIG. 1. The logic 113 may emit, generate, or record one or more events, patches, updates, or edits that are relevant to conditions and/or a rule. For example, the conditions and/or the rule may indicate that an alert or other downstream action is to be initiated if certain attributes, such as attributes A and B, satisfy or meet certain thresholds, values, and/or other restrictions. The attributes A and B may refer to any characteristics, parameters, counts, and/or aspects of an entity or a group of entities, such as a speed of a car, or a number or count of persons or inventory within a particular region or different regions. The attributes A and B may be quantitative or qualitative, and/or reflected as a Boolean indicator. The thresholds may be either predetermined or fixed, or dynamically determined based on an entity, an entity type, and/or entity properties. The logic 113 may perform a recording process 170 of any changes, events, patches, updates, or edits pertaining to the attributes A and B. As a result of the recording process 170, the logic 113 may generate or receive a log 151 which indicates changes 152 of attribute A and respective timestamps or time indications (hereinafter "timestamps") 153 corresponding to the changes 152 of attribute A. The log 151 further indicates changes 154 of attribute B and respective timestamps 155 corresponding to the changes 154. For example, the timestamps 153 and 155 may indicate respective times at which the changes 152 and 154 occurred. The timestamps 153 and 155 may indicate same or different times. The logic 113 may selectively generate an alert 160, or perform some downstream action, for example, if the changes of attribute A and/or attribute B satisfy, or cause the attributes A and B to satisfy, a rule associated with the trigger conditions of the attribute A and/or the attribute B. For instance, if a rule stipulates that an alert is to be generated if either or both attributes A and B satisfy the respective trigger conditions, then the logic 113 may generate the alert 160. However, if a rule stipulates that an alert is not to be generated if both attributes A and B satisfy the respective trigger conditions, then the logic 113 may refrain from generating the alert 160. Other examples of downstream actions, which are not limited to generating alerts, are described with respect to FIG. 12. In the subsequent figures, references to generating alerts may be understood to further encompass these other downstream actions.

The logic 113 may continuously monitor for new results, such that following the receipt of new information, and/or periodically, the logic 113 may iteratively generate or receive a record of any changes or events pertaining to the attributes A and B in a same or similar manner as described with respect to the recording process 170. The logic 113 may receive and/or process the new information at a same rate, frequency, and/or approximately a same time as that of the initial receipt or collection of the new information, or at a different rate, frequency, and/or different time. The logic 113 may further iteratively generate or receive a log in a same or similar manner as described with respect to the log 151. Thus, downstream actions may be continuously performed whenever any changes in attributes conform to a rule.

In some examples, the recording process 170 and the generating of the log 151 may be interdependent and/or simultaneous or overlapping processes. For example, the recording process 170 may be occurring to detect any changes or events at an overlapping time period as the generating of the log 151 regarding previous changes or events. In some examples, the generating of the log 151 may trigger the recording process 170 to monitor for additional criteria. Specifically, if the monitoring process has a purpose to detect wireless network abnormalities and a parameter monitored for is network traffic, and the generating of the log 151 uncovers that the parameter has changed drastically, or by greater than a threshold extent, then the monitoring process may be modified to detect additional parameters such as a number of detected connections such as Transmission Control Protocol (TCP) connections over a given period of time, or parameters or characteristics related to changes in packet distribution across ports.

The logic 113 may determine and/or adjust a manner of monitoring and/or performing of downstream actions depending on complexity of evaluation of the conditions and/or rules, and/or a permitted delay or lag time. For example, a tradeoff may be that the more complex the evaluation of conditions and/or rules, then the greater the delay or lag time. The lag time may be between a first instance when data changes and a second instance when the change is actually processed or monitored. In some instances in which lag time exceeds some threshold duration, the logic 113 may perform monitoring and/or performing of downstream actions based at least in part on predicted, rather than actual, attributes or parameters, as will be described with respect to FIG. 7.

The logic 113 may further adjust a manner of monitoring and/or performing of downstream actions depending on an access control level or access control permissions of a user requesting the monitoring and/or performing of downstream actions. For example, the logic 113 may not actually perform monitoring and/or downstream actions on any attributes and/or entities that are outside of access control privileges of a user. As a specific example, say that a rule stipulates that whenever an entity arrives within a certain geospatial window, to trigger an alert. If an entity A arrives within this geospatial window, but the user is unauthorized to access information regarding this entity A, then the logic 113 may refrain from monitoring entity A or triggering any downstream actions for entity A for this user. In other scenarios, depending on a level or extent of access privileges of the user, the logic 113 may selectively perform only certain monitoring and/or downstream actions. Specifically, if the user has read access privileges but not write access privileges regarding entity A, then the logic 113 may alert the user regarding entity A, but refrain from performing other downstream actions such as changing data regarding entity A or other entities, or triggering other monitoring actions.

As another example, say that a rule stipulates that whenever an aggregate condition or property, signifying a sum of or over an attribute across different entities, such as a count of entities within a geospatial window, reaches a threshold count such as 100, to trigger an alert. If the count of entities within the geospatial window reaches 100, but the user does not have access privileges to access information regarding at least some of the entities, the logic 113 may or may not still trigger an alert. If the logic 113 still triggers an alert, the logic 113 may refrain from displaying or disseminating information regarding specific entities that the user is unauthorized to view.

Figure 3:
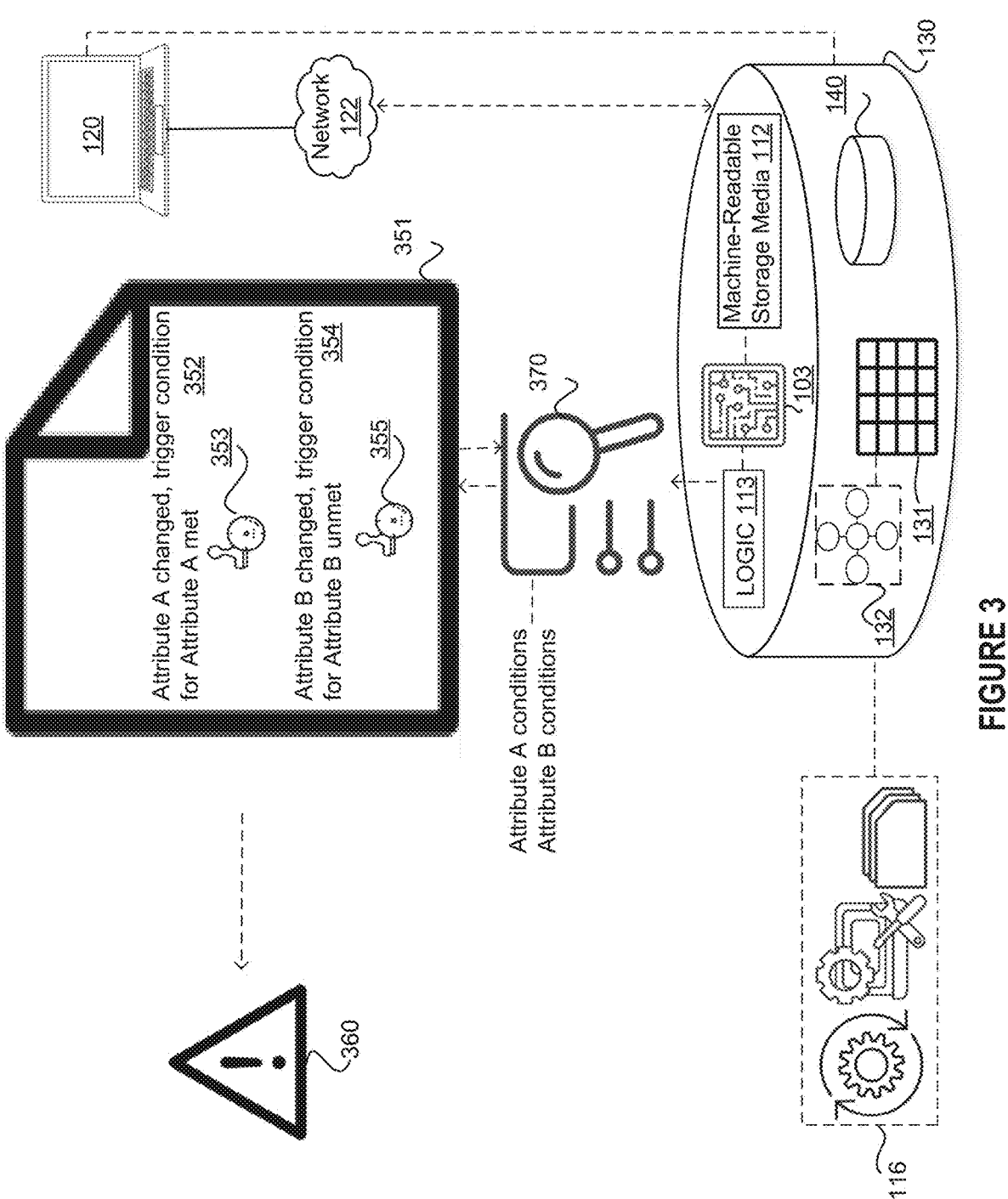
FIG. 3 illustrates an example operation of log generation.

FIG. 3 illustrates another example of log generation. Relevant principles elucidated and illustrated in FIGS. 1 and 2 are also applicable to FIG. 3. The logic 113 may perform a recording process 370 of any changes or events pertaining to the attributes A and B. The logic 113 may generate or receive a log 351 which includes an indication 352 that attribute A has changed and whether the change causes a trigger condition for attribute A to be met or satisfied. For example, if a trigger condition for an alert stipulates that a value of A is to exceed 3 and the value of A has changed, as compared to a previous iteration, from 2 to 4, then the trigger condition has been met. The indication 352 may signify that the trigger condition for attribute A has been met due to the change in attribute A.

The log 351 may further include an indication 354 that attribute B has changed and whether the change causes a trigger condition for attribute B to be met or satisfied. Here, the indication 354 signifies that despite the change, the trigger condition for attribute B is unmet. The log 351 further includes respective timestamps 353 and 355 corresponding to the indications 352 and 354, which indicates a time at which the changes of attribute A and attribute B occurred.

The logic 113 may output or emit an alert 360, or perform some downstream action, if the change to attribute A satisfies a rule associated with the trigger condition of the attribute A and/or the attribute B. For instance, if a rule stipulates that an alert is to be generated if either or both attributes A and B satisfy the respective trigger conditions, then the logic 113 may generate the alert 360. However, if a rule stipulates that an alert is not to be generated if only one of the attributes A and B satisfy the respective trigger conditions, then the logic 113 may refrain from generating the alert 360. In some examples, a log may have features from both FIGS. 1 and 3, for example, including particular details of changes of the attributes A and B, such as values or parameters changed from and/or changed to, and indications of whether or not the changes cause the trigger conditions of the attributes A and B to be met or satisfied.

Figure 4:
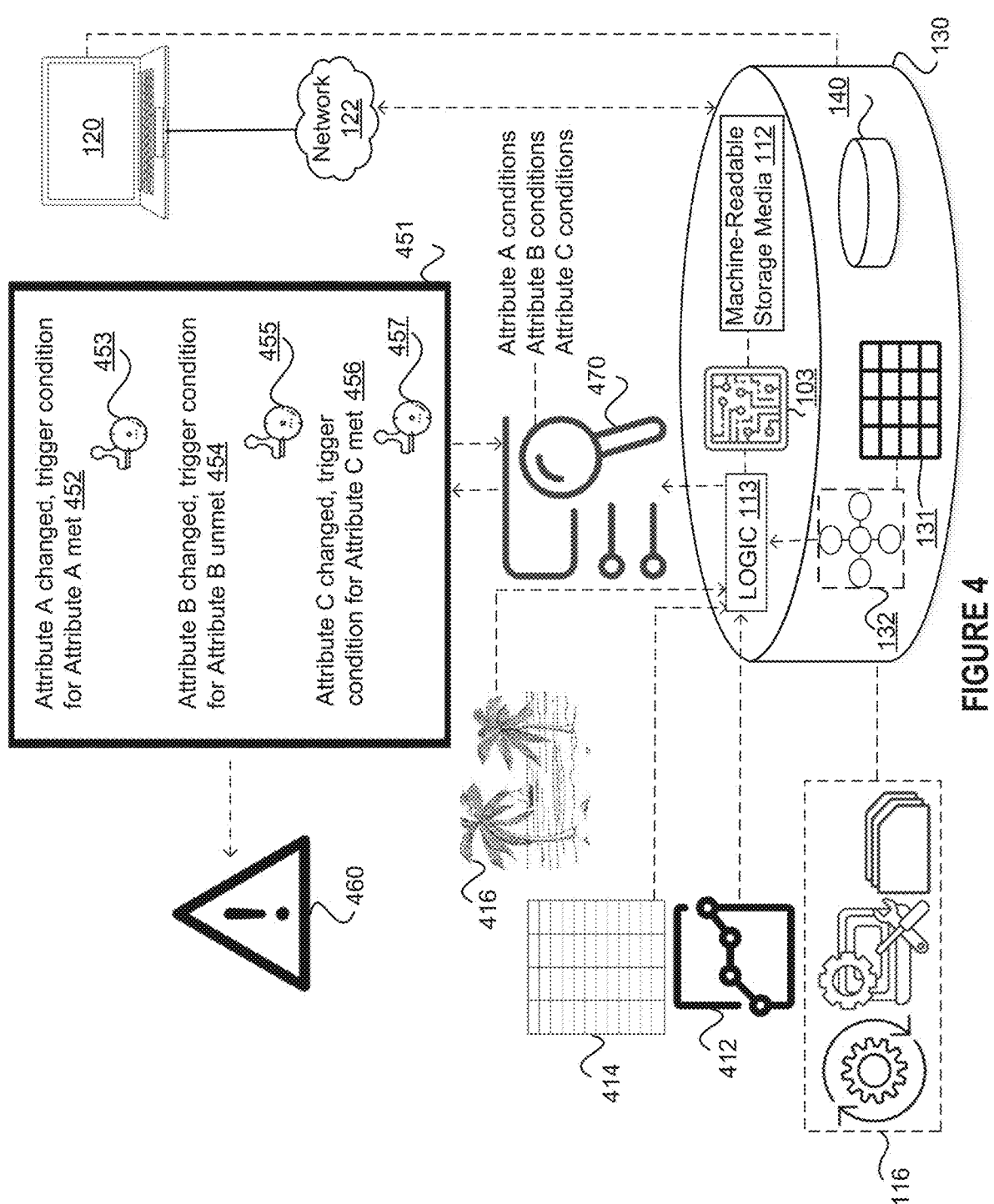
FIG. 4 illustrates an example operation of performing monitoring on data from disparate external sources or external databases and/or having different formats.

FIG. 4 illustrates an example operation of performing monitoring on data from disparate external sources or external databases and/or having different formats. For example, in FIG. 4, the logic 113 may, additionally or alternatively to monitoring on the object-oriented information 132, perform monitoring on time-series data 412, relational or tabular data 414, and/or data comprising media 416, such as audio, video, and/or images. In some examples, the logic 113 may perform processing on the aforementioned data from disparate external sources or external databases in order to perform monitoring on attributes of the aforementioned data. For example, a user may define monitoring criteria in terms of, or that is specifically compatible with, time series data. However, if underlying data is in a different format or type such as an object database or a relational datastore, the logic 113 may transform the underlying data to derive a time series representation of non-time series data to evaluate the monitoring criteria.

In other examples, the logic 113 may delegate, to the external databases, the recording of events and generating of a log. In the example of FIG. 4, attributes on which the monitoring is based may include any of Attribute A, B, and/or C. For example, monitoring an entity may encompass processing or evaluating data from two or more underlying databases, one of which stores a metadata object in a language such as SQL that corresponds to the entity, and another of which corresponds to timestamped geolocation information of the entity. The metadata object may indicate or confirm a type or a nature of the entity, such as a ship, and may be aligned and/or merged with the underlying database which corresponds to timestamped geolocation information of the entity.

The logic 113 may, from the disparate external sources, perform a recording operation 470 of any changes or events pertaining to attributes A, B, and/or C. The logic 113 may generate or receive a log 451, which may be implemented in a same or similar manner compared to the logs 151 and 351. The log 451 may include an indication 452 that a value of attribute A has changed and whether the change causes a trigger condition for attribute A to be met or satisfied. The log 451 may include an indication 454 that a value of attribute B has changed and whether the change causes a trigger condition for attribute B to be met or satisfied. The log 451 may include an indication 456 that a value of attribute C has changed and whether the change causes a trigger condition for attribute C to be met or satisfied. The log 451 may further include respective timestamps 453, 455, and 457 corresponding to the indications 452, 454, and 456. In some examples, the logic 113 may generate separate logs for each of the disparate external sources, instead of a single log. For example, the logic 113 may generate separate logs for each of attributes A, B, and C, if each of these attributes are from disparate data sources which may have different formats.

The logic 113 may output or emit an alert 460, or perform some downstream action, if the change to attributes A and C satisfy a rule associated with the trigger conditions of the attributes A, B, and/or C. For instance, if a rule stipulates that an alert is to be generated if at least two of attributes A, B, and/or C satisfy the respective trigger conditions, then the logic 113 may generate the alert 460. However, if a rule stipulates that an alert is not to be generated if both of the attributes A and C satisfy the respective trigger conditions, then the logic 113 may refrain from generating the alert 460.

As a specific scenario in accordance with the principles described in FIG. 4, the logic 113 may evaluate a rule that stipulates a combination of conditions. A first condition may state that an aggregate condition or property, such as a count of all entities of type A, reaches a first threshold (either a lower bound or an upper bound). A second condition may state that a change, over a given duration, of a count of all entities of type B exceeds a second threshold. The rule may require that both the first condition and the second condition be satisfied in order for an alert to be triggered. As another example, a first condition and/or a second condition may specify that a proportion associated with an aggregate condition or property reaches a first threshold proportion and/or a second threshold proportion (either a lower bound or an upper bound). For example, the rule may stipulate that an alert or other downstream action is to be triggered if more than 50%, or less than 50%, of entities as a whole, or a subset of entities having a specific entity type, meet certain conditions or attributes.

Evaluation of such rules may entail processing data from at least two different databases, a first database which includes time-series data and a second database which includes non-time-series data. The ability to simultaneously evaluate time-series data and non-time-series data represents an improvement over many existing technologies, which are optimized for only time-series data or only tabular data.

As yet another specific scenario in accordance with the principles described in FIG. 4, the logic 113 may evaluate a rule that stipulates a combination of conditions. For example, the rule may require that a first entity of type A be within a given geospatial region and within a given distance of a second entity of type A or type B. Evaluation of such a rule may entail processing data from at least two different databases, likely of different formats. These databases may encompass a first database that identifies a first entity is of type A and/or that a second entity is of type B, and a second database that tracks a current position or movement of the first entity and/or the second entity.

Figure 5:
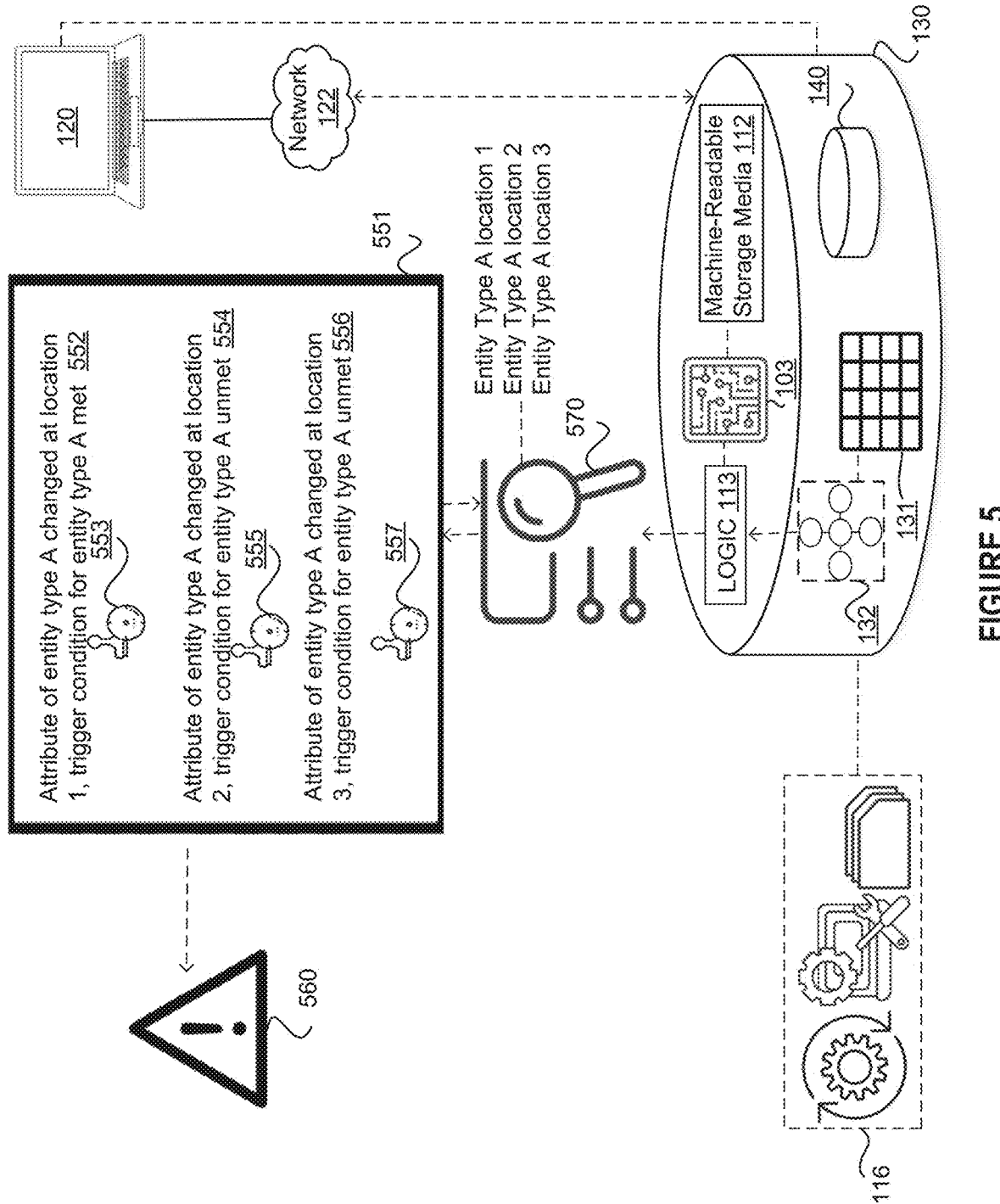
FIG. 5 illustrates an example operation of performing monitoring on geolocation-based data.

FIG. 5 illustrates a nonlimiting example of performing monitoring on geolocation-based data. The logic 113 may obtain an input dataset. In some scenarios, the logic 113 may convert a non-time-series dataset into a time-series dataset, as described with respect to FIG. 1. The logic 113 may perform a recording process 570 of any changes or events pertaining to certain attributes and/or entities (e.g., objects). The conditions may be associated with one or more attributes of a specific attribute type, or with a specific entity type, at different locations. The attributes may refer to an individual entity of the specific entity type or collectively to all entities of the specific entity type, such as a count of all entities of the specific entity type or of a subset of entities of the specific entity type. The logic 113 may generate a log 551 which includes an indication 552 that an attribute of entity type A at a first location has changed and whether the change causes a trigger condition for the entity type A at the first location to be met or satisfied. For example, entity type A may refer to a particular item, either animate or inanimate, at a particular location, such as on a shelf. A trigger condition for the entity type A may be a criterion, or part of a criteria, expression, or rule that determines whether a downstream operation, such as alerting, is to be initiated. For example, the trigger condition for entity type A may refer to a threshold count, such that an alert or downstream action may be commenced if a count exceeds the threshold count or decreases below the threshold count. As a specific scenario, if the current count exceeds a threshold, signifying that a count of a particular item exceeds the threshold at a first location or a first shelf, then the trigger condition for entity type A at the first location may be met or satisfied. Here, the indication 552 is that the change causes the trigger condition for entity type A at the first location to be met or satisfied. Next, the log 551 includes an indication 554 that an attribute of entity type A at a second location has changed and whether the change causes a trigger condition for the entity type A at the second location to be met or satisfied. For example, if the count exceeds the threshold, signifying that a count of the particular item exceeds the threshold at a second location or a second shelf, then the trigger condition for entity type A at the second location may be deemed met or satisfied. Here, the indication 554 is that the change does not cause the trigger condition for entity type A at the second location to be met or satisfied. Next, the log 551 includes an indication 556 that an attribute of entity type A at a third location has changed and whether the change causes a trigger condition for entity type A at the third location to be met or satisfied. For example, if the count exceeds the threshold, signifying that a count of a particular item exceeds the threshold at a third location or a third shelf, then the trigger condition for entity type A at the third location may be met or satisfied. Here, the indication 556 is that the change does not cause the trigger condition for entity type A at the third location to be met or satisfied. The log 551 may further include respective timestamps 553, 555, and 557 corresponding to the indications 552, 554, and 556. The logic 113 may selectively output or emit an alert 560, or perform some downstream action, if the change to entity type A satisfies a rule associated with the trigger condition of the entity type A at any of the first, second, or third locations. For example, if the rule specifies that the alert 560 is to be triggered as long as a trigger condition, or a threshold condition for an attribute of entity type A, is met at one location, then the logic 113 may output the alert 560. However, if the rule specifies that the triggering of the alert 560 requires that numerous trigger conditions for an attribute of entity type A at numerous locations be met, then the logic 113 may refrain from triggering the alert 560. As a specific example, the logic 113 may trigger an alert or a downstream action if an inventory of an entity type A, which may be an item or a product, exceeds the threshold count, in any specified location.

In some examples, the logic 113 may determine to trigger a downstream action when the rule becomes met and trigger again when the rule becomes unmet. For example, the rule may become met when in a previous iteration or most recent time instance (hereinafter "iteration"), the rule was unmet, but in a current iteration, the rule is met. The rule may become unmet when in a previous iteration, the rule was met, but in a current iteration, the rule is unmet. In some examples, if the rule was met in a previous iteration and remains met, then the logic 113 may refrain from triggering. Additionally, if the rule was met in a previous iteration and continues to be met in a subsequent iteration, then the logic 113 may or may not continue to trigger a downstream action in the subsequent iteration.

Figure 6:
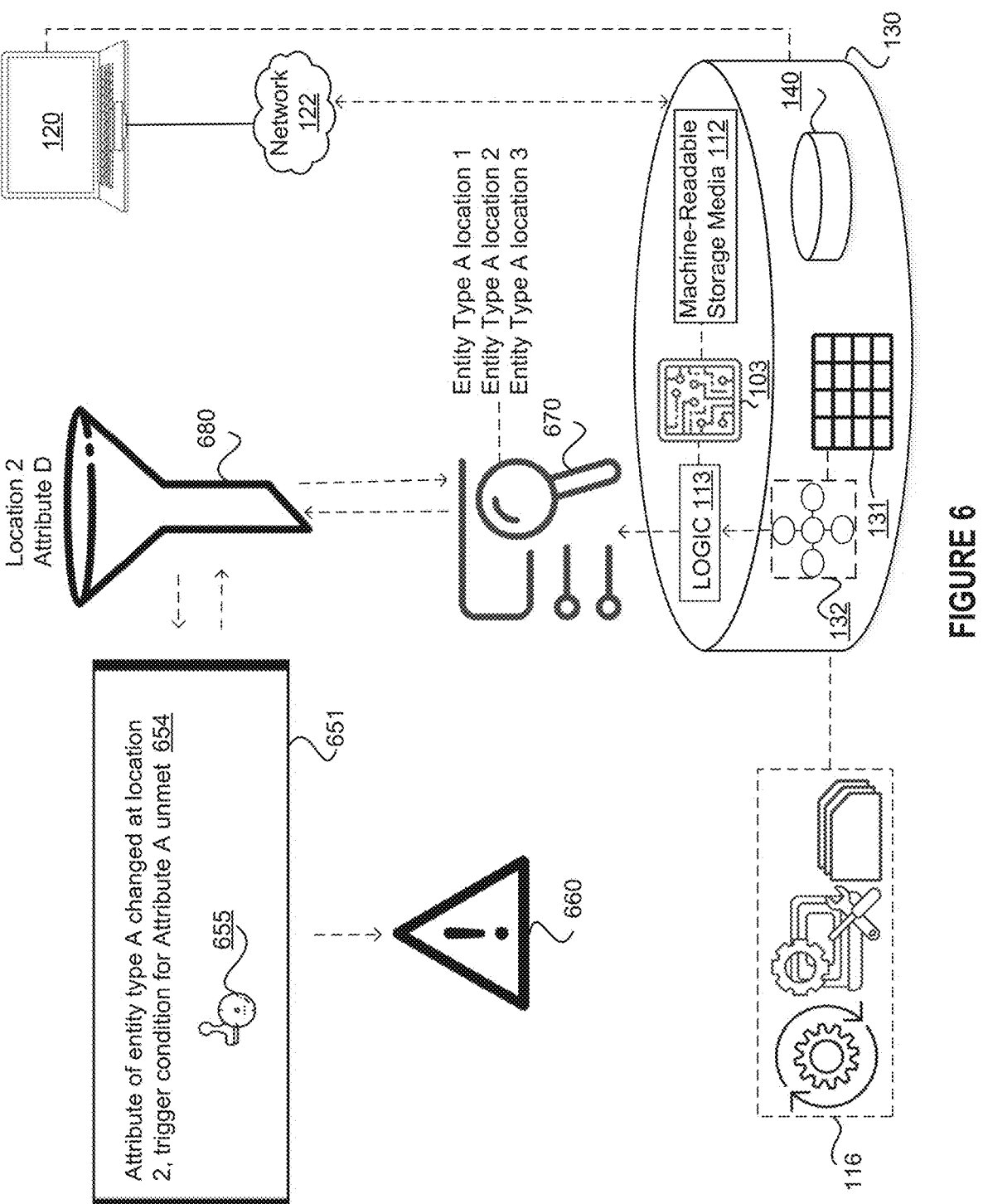
FIG. 6 illustrates an example operation of performing monitoring in conjunction with a filtering operation.

In FIG. 6, the logic 113 may perform monitoring following a filtering operation. Although the filtering operation is described in conjunction with geolocation-based data in FIG. 6, the filtering operation may be applicable to any other data types or formats. The logic 113 may perform a recording process 670 of any changes or events pertaining to certain attributes and/or entities (e.g., objects), as implemented in a same or similar manner as the recording process 570 of FIG. 5. Following the recording process 670, the logic 113 may perform a filtering operation 680 to extract a subset of the changes or events recorded by the recording process 670. For example, the filtering operation 680 may be based on certain locations and/or attributes. As a specific example, only changes or events for entities in certain locations, such as the second location and/or for entities having certain attributes, such as, having a lifetime or being in a certain location for longer than a threshold duration, may be extracted and/or considered for monitoring and/or downstream operations. For example, an entity that has existed or has been residing or been located at a certain location for at least a threshold duration may satisfy a filter criteria of the filtering operation 680. Entities that satisfy the filter criteria of the filtering operation 680 may include, for example, items that have been on a shelf for more than the threshold duration. The logic 113 may generate a log 651 following the filtering operation 680. The log 651 may be limited to entities that satisfy the filter criteria of the filtering operation 680. The log 651 may include an indication 654 that an attribute of an entity type A has changed at the second location at a timestamp 655, but that a trigger condition for the entity type A remains unmet, so that no alert 660 is triggered. However, if the trigger condition for the entity type A has been met, then the logic 113 may determine that the alert 660 is to be triggered. As a specific example, expanding on a scenario described in FIG. 6, the logic 113 may trigger an alert or a downstream action if an inventory of an entity type A, specifically limited to, or further filtered based on, entities of entity type A that have been on a shelf for greater than a threshold duration, exceeds the threshold count, at the second location.

In FIG. 7, the logic 113 may perform monitoring following a predicting operation. Although the predicting operation is described in conjunction with geolocation-based data in FIG. 7, the predicting operation may be applicable to any other data types or formats. The predicting operation may also be housed or implemented within an externally hosted model separate from the logic 113. This externally hosted model may be potentially designed and utilized for purposes besides monitoring and/or alerting. Such a predicting operation may compensate for delays or lags, or expected delays or lags. These expected delays or lags may be attributed to time consumed by evaluation of conditions and/or rules, and may be particularly relevant when multiple conditions are evaluated. Thus, the predicting operation is intended to output a more accurate value or attribute of an entity at a current time. As a result, despite processing delays, potential situations which may require certain actions may nonetheless be uncovered and addressed, thereby mitigating or eliminating other more serious consequences. Specifically, if current characteristics or parameters indicate or suggest an impending failure or malfunction, the logic 113 may trigger some action to prevent or mitigate such an impending failure or malfunction.

The logic 113 may perform a recording process 770 of any changes or events pertaining to certain attributes and/or entities (e.g., objects), as implemented in a same or similar manner as the recording process 570 of FIG. 5. Following the recording process 770, the logic 113 may perform a predicting operation 780 to compensate for a delay or lag attributed in part to the recording process 770. The predicting operation 780 may, for example, be based on historical changes or trends, and may be performed using one or more models or algorithms. For example, the predicting operation 780 may be based on derivatives (e.g., trends, rate of increases or decreases) of current characteristics, ambient conditions such as those detected by one or more sensors, an extent to which current ambient conditions match previous ambient conditions during which predictions were made, and/or qualitative information such as reports by one or more users. Additionally or alternatively, the predicting operation 780 may not be based on a straightforward interpretation or analysis of current or historical values, but, rather, based on a predictive model that accounts for interactions between variables. In some examples, the predicting operation 780 may be performed if a delay or lag exceeds a threshold duration. Otherwise, the logic 113 may refrain from performing the predicting operation 780.

The logic 113 may generate a log 751 following the predicting operation 780. Thus, values or attributes memorialized or stored within the log 751 may be predicted values or predicted attributes rather than actual recorded or received values, which may not reflect a state or status at a current time. The log 751 may include an indication 752 that a predicted attribute of entity type A at a first location has changed from a corresponding previously determined or previously predicted attribute of the entity type A, and whether this predicted change causes a trigger condition for the entity type A at the first location to be met or satisfied. For example, the entity type A may refer to a particular item, either animate or inanimate, at a particular location, such as on a shelf. A trigger condition for the entity type A may be a criterion, or part of a criteria, expression, or rule that determines whether a downstream operation, such as alerting, is to be initiated. For example, the trigger condition for entity type A may refer to a threshold count, such that an alert or downstream action may be commenced if a predicted count exceeds the threshold count or decreases below the threshold count. As a specific scenario, if the count exceeds a threshold, signifying that a predicted count of a particular item exceeds the threshold at a first location or a first shelf, then the trigger condition for entity type A at the first location may be met or satisfied. Here, the indication 752 is that the predicted change causes the trigger condition for entity type A at the first location to be met or satisfied. Next, the log 751 includes an indication 754 that an attribute of entity type A at a second location has been predicted to have changed and whether the predicted change causes a trigger condition for the entity type A at the second location to be met or satisfied. For example, if the predicted count exceeds the threshold, signifying that a predicted count of the particular item exceeds the threshold count at a second location or a second shelf, then the trigger condition for entity type A at the second location may be deemed met or satisfied. Here, the indication 754 is that the predicted change causes the trigger condition for entity type A at the second location to be met or satisfied. Next, the log 751 includes an indication 756 that a predicted change of an attribute of entity type A at a third location has occurred and whether the predicted change causes a trigger condition for entity type A at the third location to be met or satisfied. For example, if the predicted count exceeds the threshold, signifying that a predicted count of a particular item exceeds the threshold count at a third location or a third shelf, then the trigger condition for entity type A at the third location may be met or satisfied. Here, the indication 756 is that the predicted change does cause the trigger condition for entity type A at the third location to be met or satisfied. The log 751 may further include respective timestamps 753, 755, and 757 corresponding to the indications 752, 754, and 756. The logic 113 may selectively output or emit an alert 760, or perform some downstream action, if the predicted change to entity type A satisfies a rule associated with the trigger condition of the entity type A at any of the first, second, or third locations. For example, if the rule specifies that the alert 760 is to be triggered as long as a trigger condition, or a threshold condition for an attribute of entity type A, is met at one or more locations, then the logic 113 may output the alert 760. However, if the rule specifies that the triggering of the alert 760 requires that the trigger condition be met at no more than one location or no more than two locations, then the logic 113 may refrain from triggering the alert 760. As a specific example, the logic 113 may trigger an alert or a downstream action if a predicted inventory of an entity type A, which may be an item or a product, exceeds the threshold count, in any specified location.

In some examples, if an actual change, as recorded before the predicting operation 780, causes a trigger condition to be met, but the predicted change, following the predicting operation 780, results in the trigger condition being unmet, then the logic 113 may or may not trigger a downstream action. In some examples, the logic 113 may trigger a different downstream action in the aforementioned scenario, compared to a scenario when both the actual change and the predicted change results in the trigger condition being met, or when the actual change results in the trigger condition being unmet but the predicted change results in the trigger condition being met.

Figure 8:
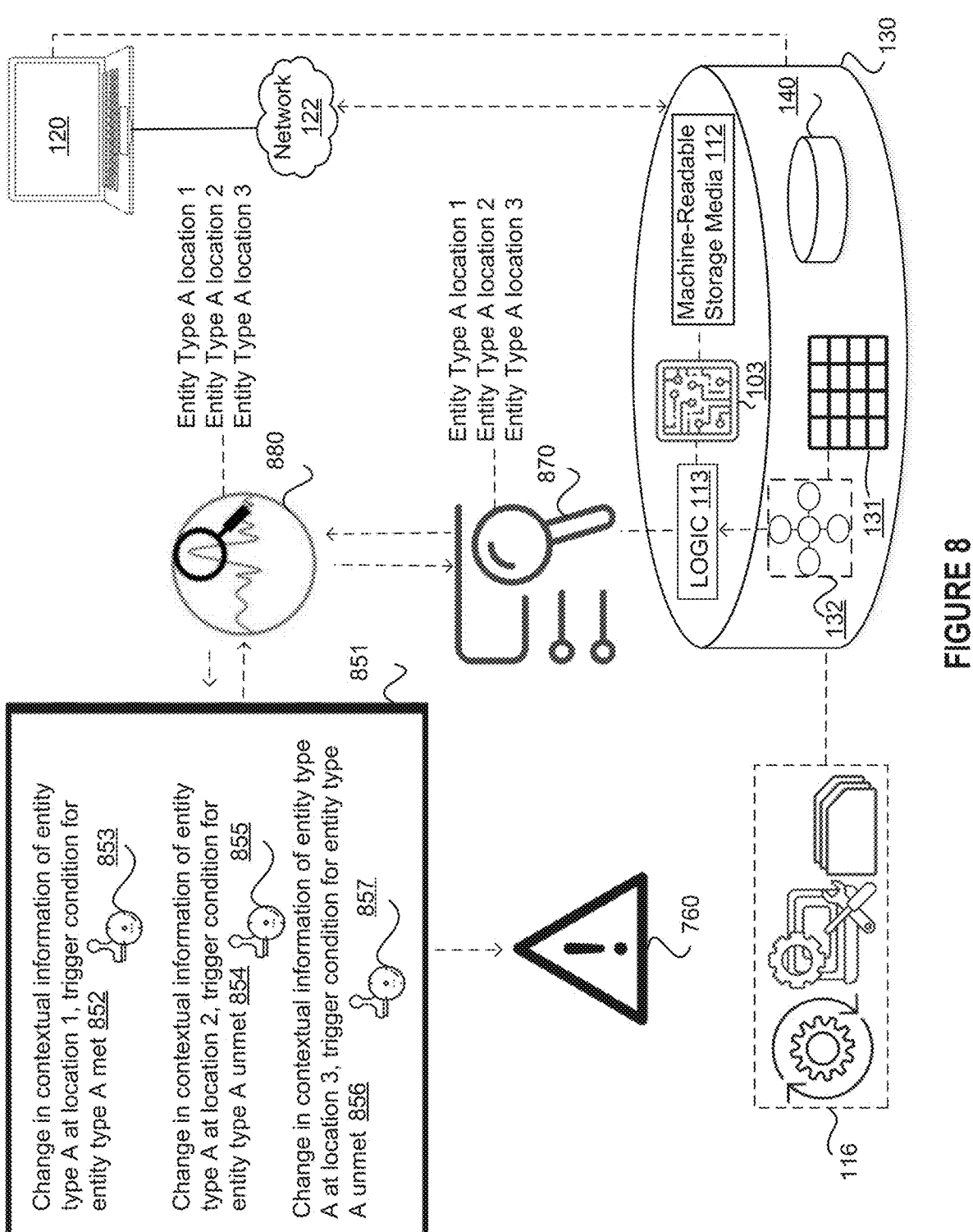
FIG. 8 illustrates an example operation of performing monitoring in conjunction with an anomaly detection process or operation.

In FIG. 8, the logic 113 may perform monitoring following an anomaly detection operation. Although the anomaly detection operation is described in conjunction with geolocation-based data in FIG. 8, the anomaly detection operation may be applicable to any other data types or formats. Such an anomaly detection operation may utilize or leverage contextual information, in addition to or instead of information recorded from a recording process 870. The recording process 870 may be performed in a same or similar manner as the recording process 570 in FIG. 5. The contextual information may include a rate, degree, extent, amount, and/or frequency of change of one or more attributes or parameters recorded. This contextual information may be analyzed or considered individually for each attribute, jointly across different attributes, and/or compared across different attributes of a same entity or across corresponding or different attributes of different entities. For example, the recording process 870 may record attributes or parameters associated with different physical locations, such as bandwidth, speed, and/or throughput of different wireless networks, or devices or machines associated with different wireless networks. During an anomaly detection operation or process (hereinafter "operation") 880, the logic 113 may evaluate a rate, degree, extent, amount, and/or frequency of a change in one or more attributes or parameters of the network in each of the wireless networks individually, in comparison with contextual information at other time instances, in comparison with other attributes at a given location, and/or in comparison with corresponding attributes or different attributes at different locations. Such evaluation increases contextual awareness and perspective in terms of monitoring for potentially anomalous behavior. For example, if a rate of change or variance of an attribute, such as a speed, differs from a rate of change or variance of the attribute at different times at a same location, or compared to a rate of change or variance of the attribute on or at different machines or locations, such a discrepancy may indicate an anomalous condition. As other comparisons to further inform or predict whether or not an anomalous condition exists, the logic 113 may compare a rate of change or variance of the speed against a rate of change or variance of other attributes or parameters, such as bandwidth and/or throughput, either on or at a same machine or location, or on or at a different machine or location. If the rate of change or variance of one attribute deviates from the rate of change or variance of other parameters, such a discrepancy may indicate an anomalous condition. The anomaly detection operation 880 may be based on a model internal to the database 130 or based on an external model.

Following the anomaly detection operation 880, the logic 113 may generate a log 851 indicating whether any change(s) in contextual information cause one or more trigger conditions to be met. The trigger conditions may define upper and/or lower bounds of the contextual information in terms of what is permitted, and what would trigger a downstream action. A trigger condition may be a criterion, or part of a criteria, expression, or rule that determines whether a downstream operation, such as alerting, is to be initiated. For example, the upper and/or lower bounds may indicate maximum or minimum permitted rates, degrees, extents, amounts, and/or frequencies of change of one or more attributes or parameters recorded, either defined individually for each location or device or each attribute or parameter, in relation to other attributes or parameters on a common device or at a common location, in relation to corresponding or different attributes or parameters on different devices or at different locations. As a specific example, a trigger condition may be that a variance of speed at a first location deviating from a variance of speed at a second location by more than a first threshold amount would trigger a downstream action, or would be one among multiple factors that would potentially trigger a downstream action. As another example, a trigger condition may be that a variance of speed at a first location deviating from a variance in bandwidth at the first location by more than a second threshold amount would trigger a downstream action, or would be one among multiple factors that would potentially trigger a downstream action. As another example, a trigger condition may be associated frequency, over a duration of time, in which a parameter or attribute falls outside of certain bounds or restrictions.

The log 851 may include an indication 852 that contextual information of entity type A at a first location has changed from corresponding previous contextual information of entity type A at the first location, and whether this change causes a trigger condition for entity type A at the first location to be met or satisfied. For example, the entity type A may refer to a particular item, either animate or inanimate, at a particular location, such as a network device (e.g., access point or a router). Here, the indication 852 is that the change causes the trigger condition for entity type A at the first location to be met or satisfied. Next, the log 851 includes an indication 854 that contextual information of entity type A at a second location has changed from corresponding previous contextual information of entity type A at the second location, and whether this change causes a trigger condition for entity type A at the second location to be met or satisfied. Here, the indication 854 is that the change does not cause the trigger condition for entity type A at the second location to be met or satisfied. Next, the log 851 includes an indication 856 that contextual information of entity type A at a third location has changed from corresponding previous contextual information of entity type A at the third location, and whether this change causes a trigger condition for entity type A at the second location to be met or satisfied. Here, the indication 856 is that the change does not cause the trigger condition for entity type A at the third location to be met or satisfied. The log 851 may further include respective timestamps 853, 855, and 857 corresponding to the indications 852, 854, and 856. The logic 113 may selectively output or emit an alert 860, or perform some downstream action, if the predicted change to entity type A satisfies a rule associated with the trigger condition of the entity type A at any of the first, second, or third locations. For example, if the rule specifies that the alert 860 is to be triggered as long as a trigger condition, is met at one or more locations, then the logic 113 may output the alert 860. As a specific example, the logic 113 may trigger an alert or a downstream action if a rate or change, or variance of, a parameter or attribute within one location differs from a corresponding parameter or attribute at a different location by more than a threshold amount. However, if the rule specifies that the triggering of the alert 860 requires that the trigger condition be met at two or more locations, then the logic 113 may refrain from triggering the alert 860.

Figure 9:
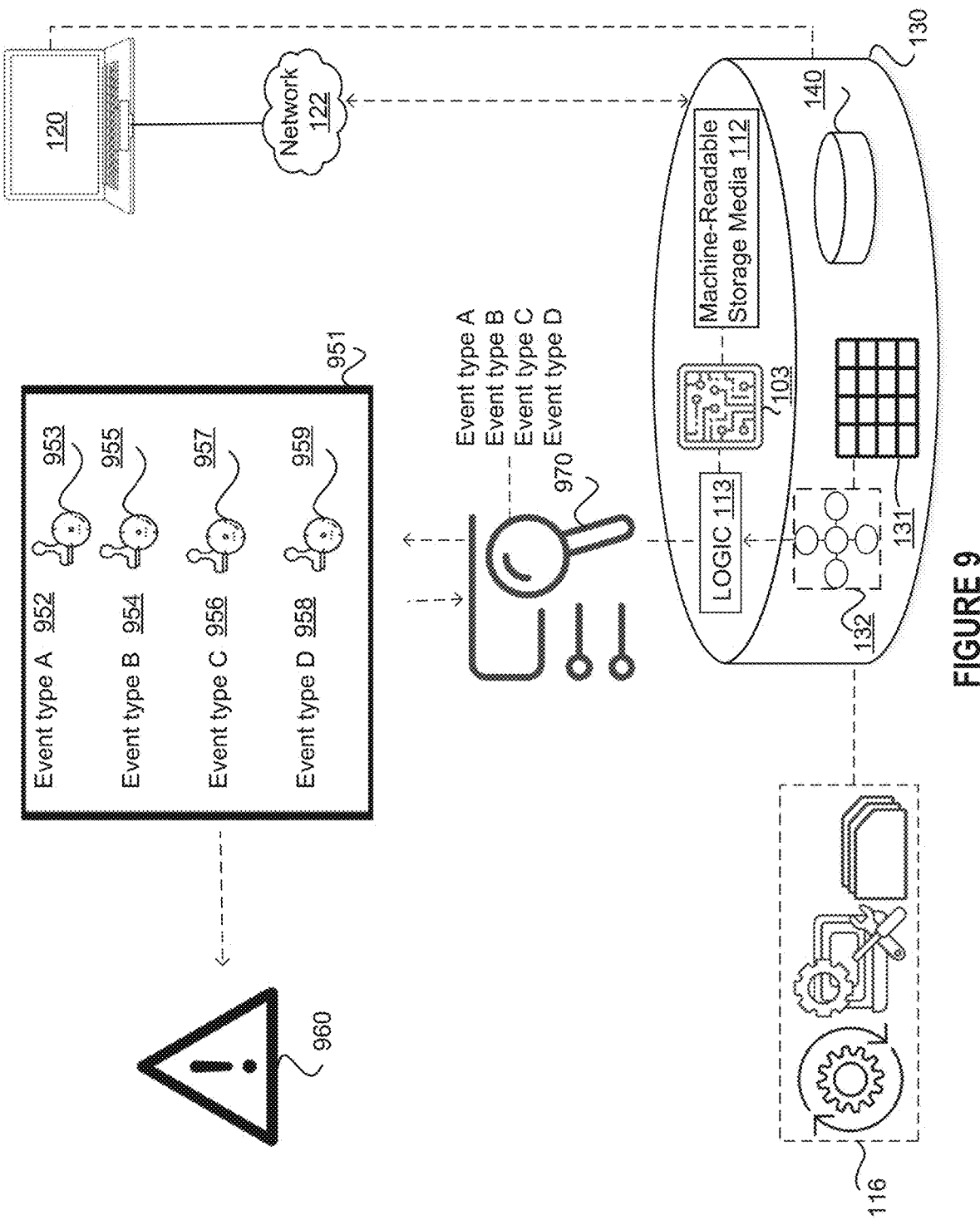
FIG. 9 illustrates an example operation of performing monitoring of temporal, time-based, or sequential-based events or tasks.

In FIG. 9, the logic 113 may perform monitoring of temporal, time-based, or sequential-based events or tasks (hereinafter referred to collectively as "events"). The events may encompass actual events or scheduled or predicted events. These events may be associated with one or more entities and/or one or more locations. The logic 113 may perform a recording process 970 in a same or similar manner as the recording process 570 in FIG. 9. For example, the recording process 970 may record one or more events, and relevant information associated with the events such as entities involved in the events, locations of the events, and/or durations of the events.

Following the recording process 970, the logic 113 may generate a log 951 indicating any events which are relevant to determining whether one or more trigger conditions have been met. A trigger condition may be a criterion, or part of a criteria, expression, or rule that determines whether a downstream operation, such as alerting, is to be initiated. A rule may specify a relative order of two or more events or event types and/or time dependencies or relationships between two or more events or event types such as two events being spaced apart by a certain duration of time, or occurring within a certain window of time. As a specific example, the rule may specify that an event type A is to occur before event type B and that event type C and event type D are to be spaced apart by a threshold duration of time, such as one hour. Otherwise, an alert may be triggered. As another specific example, the rule may specify a comparison between one or more times corresponding to one or more events and a specified time such as an expiration date or a starting date, or a comparison between an aggregate property or condition corresponding to events of a certain type or property and a specified time such as an expiration date or a starting date. As another specific example, the rule may specify a comparison between creation or origination dates of one or more events of a specific type and some other date, either predetermined or variable. In particular, the rule may entail triggering an alert or other action if an aggregate condition, such as an overall count, of events of the specific type having a creation date later than some date, falls outside of a threshold or other restriction. As yet another specific example, the rule may specify a comparison with respect to a temporal aggregate, such as a specified time window of a given duration. For example, the rule may specify that if average central processing unit (CPU) usage across different hosts goes above a certain level over a 5-minute window, to trigger an alert.

The log 951 may be limited to events or event types that are relevant to the rule. In particular, the log 951 may indicate that an event type A 952 is associated with a timestamp 953, an event type B 954 is associated with a timestamp 955, an event type C 956 is associated with a timestamp 957, and an event type D 958 is associated with a timestamp 959. From the log 951, the logic 113 may evaluate or determine whether the timestamp 953 is before the timestamp 955. If not, then the event type A 952 occurs following the event type B 954 and the logic 113 determines that the rule is violated. From the log 951, the logic 113 may also evaluate or determine whether the timestamps 957 and 959 are spaced apart by at least the threshold duration of time. If not, then the logic 113 determines that the rule is violated. If the logic 113 determines or detects any violations of the rule, then the logic 113 may trigger an alert 960 or other downstream action.

In some examples, monitoring and/or alerting may not be based on the actual data, or changes in the actual data. For example, monitoring may be based on tickets or issues that were opened for any data objects or data portions, or based on a join key, a primary key, a foreign key constraint or other relationship between two objects or data portions, and/or one or more changes in any of the aforementioned. As an illustrative example, in FIG. 10, the aforementioned may include and/or be reflected within Metadata A and Metadata B. These may not be encapsulated within a log, such as the logs 151, 351, 451, 551, 651, 751, 851, or 951. The logic 113 may then perform a recording operation 1070 to record changes in metadata 1072, which includes Metadata A and Metadata B and which may not be captured by a log. The logic 113 may evaluate whether such changes satisfy a rule associated with any trigger conditions of Metadata A and/or B, in a same or similar manner as explained with respect to previous figures such as FIGS. 1 and 3-9. The rule may indicate when an alert or downstream action is to be triggered. If such changes satisfy the rule, then the logic 113 may trigger an alert 1060.

Another change for which monitoring may be conducted, and which may not be recorded in a log, may include changes in current data and/or time which causes certain data or objects that previously failed to meet monitoring criteria to now fall under monitoring criteria. For example, such a situation may arise if a previous date and/or time indicated was erroneous and corrected. Another such change may include a change of one or more users subscribed to data and/or results. For example, a filtering criteria based on an "assignee" or "subscribed to" characteristic may be reevaluated in an event of a new subscriber or new assignee, in particular, if that new subscriber or new assignee is assigned to different data and/or results compared to previously subscribed users. Yet another such change includes a change in access control characteristics of one or more users, such that certain data may be caused to be visible or invisible.

Figure 10:
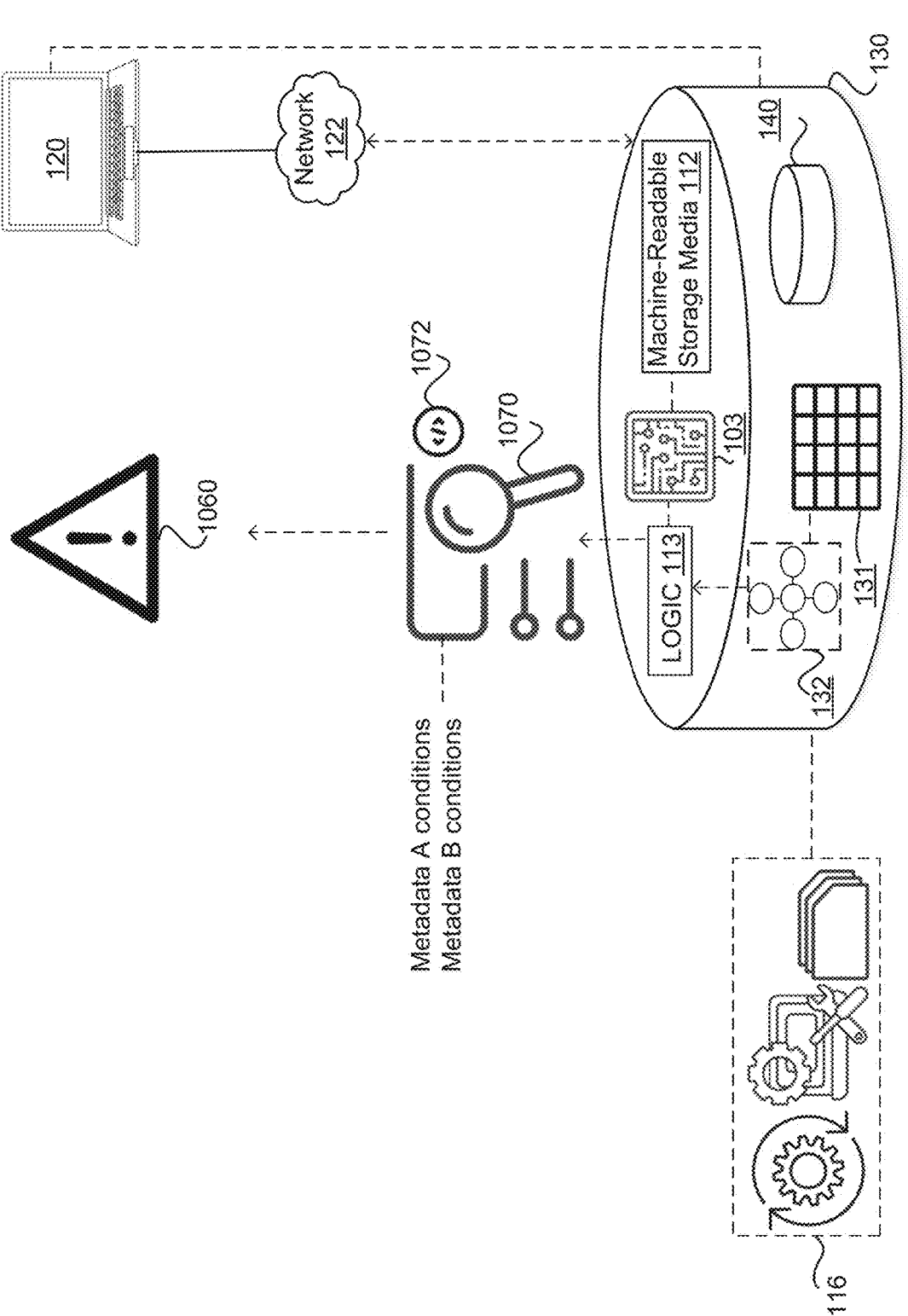
FIG. 10 illustrates an example operation of performing monitoring based on metadata.
Figure 11:
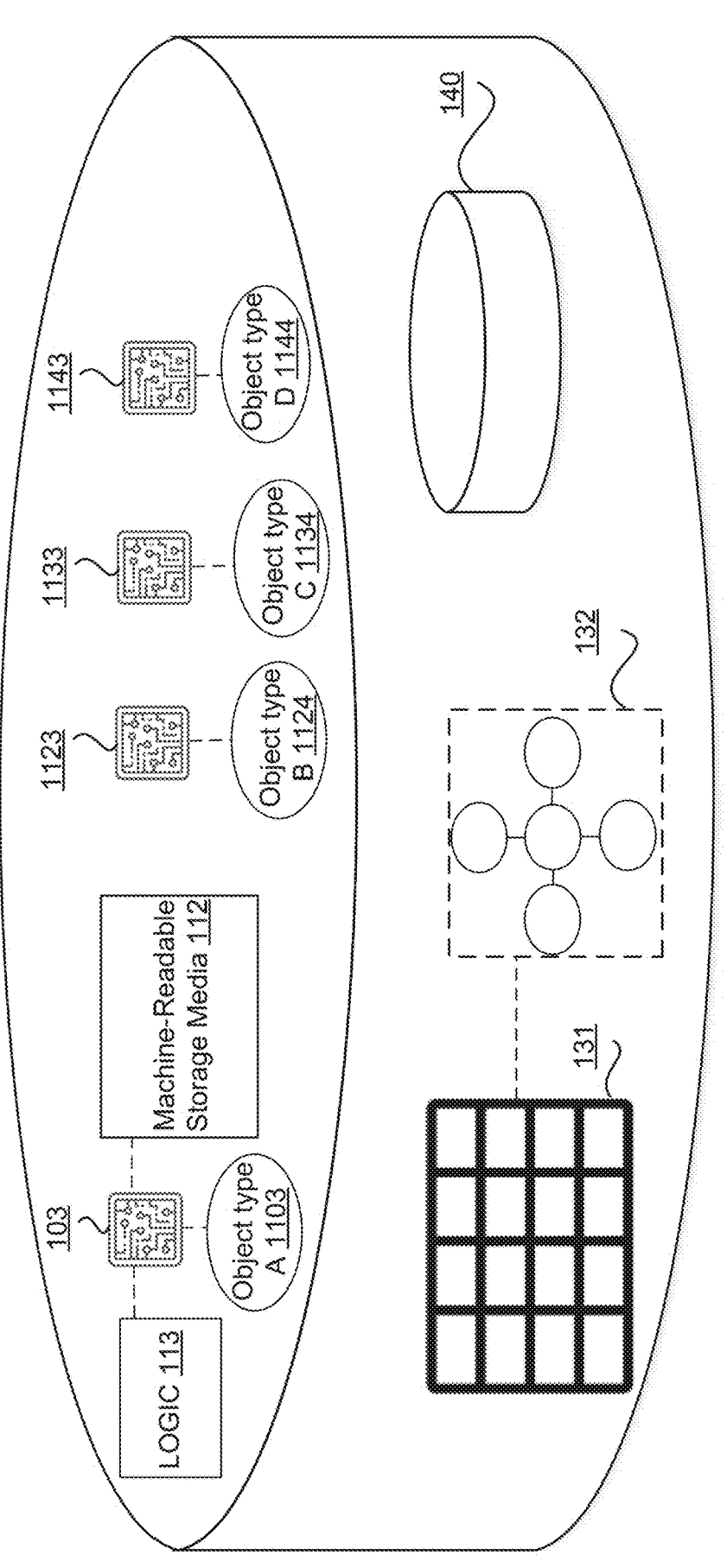
FIG. 11 illustrates an example distributed computing system in which each node, processor, or monitor is responsible for one object type or data type.

FIG. 11 illustrates a distributed computing system within the database 130, in which each processor, node, or monitor (hereinafter "processor") performs functions of monitoring and/or alerting for a single object type or data type. An object type may refer to a classification or a category of an object, such as "automobile," "person," or "machine." Thus, one processor may perform monitoring and/or alerting on any object types that are automobiles, whereas another processor may perform monitoring and/or alerting on any object types that are persons, at least partially in parallel. Additionally, each processor may compute relevant inputs to the logic 113 in parallel before combining the inputs at a subsequent stage for alerting. For example, navigating a vehicle may encompass monitoring for conditions of different categories and/or data types, such as weather conditions, which may be non-geospatial data, and obstacles, which may include geospatial data. The weather conditions and the obstacles may be separately monitored and/or analyzed by different processors in parallel. These inputs may be combined by the logic 113 to evaluate monitoring criteria based on an entirety of the inputs. In such a manner, a situation in which multiple processors are performing repetitive or redundant monitoring and/or alerting may be prevented, thereby not only conserving computing resources but also avoiding confusion of multiple alerts being generated for a same underlying issue. In FIG. 10, the processor 103 may establish a consensus, with other processors 1123, 1133, and 1143, regarding a particular object type that each of the processors is to perform monitoring and/or alerting on. In particular, the processor 103 may perform monitoring and/or alerting on an object type A 1103. The processor 1123 may perform monitoring and/or alerting on an object type B 1124. The processor 1133 may perform monitoring and/or alerting on an object type C 1134. The processor 1143 may perform monitoring and/or alerting on an object type D 1144.

Figure 12:
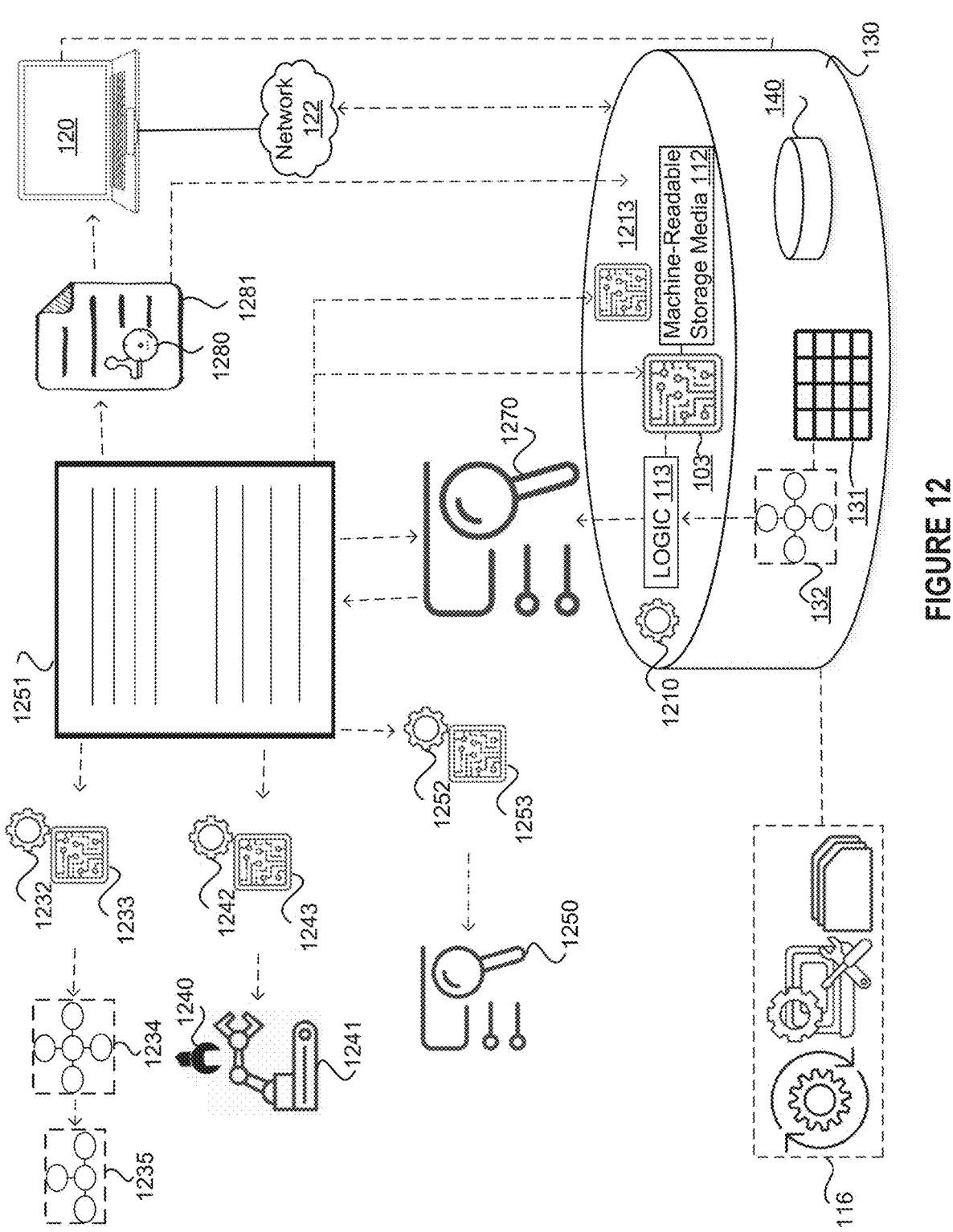
FIG. 12 illustrates examples of downstream actions.

FIG. 12 illustrates downstream actions that may be performed, in association with any concepts illustrated with respect to any of FIGS. 1-11. These downstream actions may include alerting, as previously alluded to, presenting information, calling another application programming interface (API) or webhook, performing additional monitoring by triggering one or more additional monitors, writing data to the database 130 and/or to an external database, and/or performing a transformation or change on underlying data and/or a device associated with the underlying data. In FIG. 12, the logic 113 may perform a recording process 1270 in a same or similar manner as any of the recording processes 170, 370, 470, 570, 670, 770, 870, 970, and/or 1070. The logic 113 may generate a log 1251 according to, or consistent with, principles of any of the logs 151, 351, 451, 551, 651, 751, 851, 951, and/or 1051.

Based on the log 1251, the logic 113 may evaluate any changes or updates of entities or attributes against one or more rules and selectively implement or initiate one or more downstream actions based on the evaluation. A first example downstream action may be collecting additional information by performing additional monitoring within the database 130. For example, the additional monitoring may include monitoring for a same entity or attribute over a longer period of time, at a same or increased sampling rate. Other examples of additional monitoring may include, monitoring for a different entity or different attribute. As a specific example, assume that the recording process 1270 records attributes or parameters associated with different wireless or wired networks, such as bandwidth, speed, and/or throughput of different wireless networks, or devices or machines associated with different wireless networks. If one, or any of, the attributes or parameters fall outside of operating ranges or thresholds, the logic 113 may trigger an alert, and/or may initiate additional monitoring or recording of the attributes or parameters, and/of different attributes or parameters such as delay, packet loss, or jitter. In other examples, the logic 113 may, additionally or alternatively, trigger monitoring or recording of other entity types, such as, other network devices or client devices that may be affected by the attributes or parameters. This monitoring or recording of other entity types may be delegated to a different processor 1213, which may also be associated with the database 130. In other examples, the logic 113 may, additionally or alternatively, modify or otherwise transform data within the database 130. For example, such modification of data may entail creating, editing, or removing entities or links. To elucidate any effects of modifications of data, the logic 113 may further simulate further downstream actions that would be, or would be predicted to be triggered, as a result of the modification. Such simulation may provide a preview function before finalizing the modifications to the data. In other examples, the logic 113 may write, to the database 130, information of or related to the recording process 1270 and/or the log 1251.

In other examples, a downstream action may include a transmission or presentation of information 1281, an alert, and/or a notification to the to the computing device 120 and/or to other devices. The information 1281 may include indications of which attributes or parameters fall outside of operating ranges or thresholds, or reasons that an alert was triggered, and/or one or more timestamps 1280 corresponding to an originating or creation time of underlying data that caused the triggering of the alert. Alternatively, the one or more timestamps 1280 may indicate or reflect a predicted time, if the information 1281 is based on predicted rather than actually measured information. This information 1281 may be transmitted or published back to the database 130, or to an external source. For example, the information 1281 may be published back in an object format which may facilitate analysis of the information 1281. In some examples, this downstream action of alerting, notifying, transmission, presentation, or publication of information may be performed by one or more APIs.

In yet other examples, a downstream action may entail an API 1210 of the database 130 interfacing with or calling one or more other APIs 1232, 1242, and/or 1252 of other external systems and/or processors (hereinafter "other processors") 1233, 1243, and/or 1253, respectively. For example, the other processor 1233 may perform modification of data from original data 1234 into modified data 1235 in an external database. The original data 1234 may have been transmitted to the database 130, and the recording process 1270 performed thereon. This modified data 1235 may be ingested into and synchronized with the database 1235. The modification may encompass creating, editing, or removing entities or links. Meanwhile, the other processor 1243 may perform an operation 1240 on a device 1241 that is associated with data captured in the log 1251. For example, if the log 1251 indicates that the device 1241 has attributes or parameters that trigger an alert, then the processor 1243 may adjust the attributes or parameters through some electronic or physical operation. Thus, the operation 1240 may be a repair or maintenance operation, to name some non-limiting examples. In other examples, if the log 1251 indicates that inventory is outside of permitted bounds, then the inventory may be adjusted accordingly by physically coordinating the addition or removal of items until the inventory is within permitted bounds. As yet another example of a downstream action, the other processor 1253 may initiate a recording operation 1250 on external data, in a same or similar manner as the recording operation 1270, except that it is performed on data external to the database 130.

In some examples, downstream actions may be disabled or delayed even if a rule indicates that a downstream action is to be initiated. Any information captured by the recording operation 1270 may still be retained. In some examples, the logic 113 may determine or select one or more specific downstream actions to initiate or implement, at least based on a severity level, as alluded to in FIG. 1.

FIG. 13 illustrates a computing component 1300 that includes one or more hardware processors 1302 and machine-readable storage media 1304 storing a set of machine-readable/machine-executable instructions that, when executed, cause the hardware processor(s) 1302 to perform an illustrative method of monitoring and/or initiating of downstream actions. The computing component 1300 may be implemented as the computing system 102 of FIGS. 1-12. The hardware processors 1302 may be implemented as the hardware processors 103 of FIGS. 1-12. The machine-readable storage media 1304 may be implemented as the machine-readable storage media 112 of FIGS. 1-12, and may include suitable machine-readable storage media described in FIG. 14. The computing component 1300 may be associated with, or reside within, a database such as the database 130.

At step 1306, the hardware processor(s) 1302 may execute machine-readable/machine-executable instructions stored in the machine-readable storage media 1304 to receive a monitoring request. The monitoring request may include one or more entities or attributes to be monitored, one or more rules to be evaluated with respect to the entities or attributes, and one or more downstream actions to be selectively triggered based on the evaluation. This monitoring request may be received from the computing device 120. As a nonlimiting example, a monitoring request may be a request to track inventory of a specific entity type at different locations, as alluded to in FIGS. 5-8. Here, the attributes may refer to an aggregate property or an aggregate count of entities of a specific entity type. The one or more rules may include permitted upper and lower bounds of the aggregate counts of the entities at each location and may specify that if one location, or if more than one location, has an aggregate count that falls outside of the upper and lower bounds, then a downstream action is triggered. As another example, a monitoring request may be associated conditions of a wireless or wired network and/or associated devices, as alluded to in FIG. 8. Here, the attributes may refer to properties indicative of network anomalies, such as the contextual information described in FIG. 8. This contextual information may include a rate, degree, extent, amount, and/or frequency of a change in certain properties or attributes of the network such as speed or bandwidth. Here, the one or more rules may include permitted ranges or values, either qualitative or quantitative, associated with the contextual information. If the contextual information falls outside of the permitted ranges or values, then a downstream action is to be triggered.

At step 1308, the hardware processor(s) 1302 may execute machine-readable/machine-executable instructions stored in the machine-readable storage media 1304 to obtain data associated with the entities or the attributes. For example, the obtained data may be from disparate databases and/or have different formats, such as an object-oriented data format, a sensor data format, a tabular data format, a media format such as an image, video, or an audio, and/or a time-series format, as described in FIG. 4. In some scenarios, the hardware processor(s) 1302 may convert the obtained data from an original format to a different format to facilitate a recording operation and monitoring on the data. For example, the hardware processor(s) 1302 may convert the obtained data to a time-series format.

At step 1310, the hardware processor(s) 1302 may execute machine-readable/machine-executable instructions stored in the machine-readable storage media 1304 to generate a log, such as any of the logs 151, 351, 451, 551, 651, 751, 851, 951, 1051, and/or 1251 as illustrated in FIGS. 1, 3-10, and/or 12, respectively. The log may include changes or updates, relative to a previous iteration, of the entities or the attributes. In some examples, the log may be limited to changes or updates that are relevant to evaluation of the rules. For example, if the rules include or implicate a first parameter or attribute but do not include or implicate a second parameter or attribute, then the log may be limited to changes or updates in the first parameter or attribute, because the second parameter or attribute does not affect evaluation of the rules. In such a manner, processing and storage costs are conserved.

At step 1312, the hardware processor(s) 1302 may execute machine-readable/machine-executable instructions stored in the machine-readable storage media 1304 to evaluate, based on the log, the changes or the updates against the one or more rules. At step 1314, the hardware processor(s) 1302 may execute machine-readable/machine-executable instructions stored in the machine-readable storage media 1304 to selectively implement one or more actions based on the evaluation of the changes or the updates, as reflected, for example, in FIG. 12. As alluded to, the one or more actions may also depend on a severity or an extent of deviation of the monitored data from permitted ranges, values, and/or fields, and/or an extent of a change from a previous iteration.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 14:
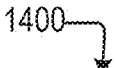
FIG. 14 illustrates a block diagram of an example computer system in which any of the embodiments described herein may be implemented.

FIG. 14 is a block diagram that illustrates a computer system 1400 upon which any of the embodiments described herein may be implemented. In some examples, the computer system 1400 may include a cloud-based or remote computing system. For example, the computer system 1400 may include a cluster of machines orchestrated as a parallel processing infrastructure. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a cathode ray tube (CRT) or LCD display (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise nonvolatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may retrieves and executes the instructions. The instructions received by main memory 1406 may optionally be stored on storage device 1410 either before or after execution by processor 1404.

The computer system 1400 also includes a communication interface 1418 coupled to bus 1402. Communication interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network(s), network link and communication interface

1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A computing system, comprising:
one or more processors; and
memory storing instructions that, when executed by the one or more processors, cause the system to perform:
receiving a monitoring request, wherein the monitoring request comprises entities or attributes, to be monitored, rules to evaluate whether the entities or the attributes are conforming or nonconforming, or a level of conformity, and one or more actions to be selectively triggered based on the evaluation, the entities or attributes comprising a first entity or a first attribute of the first entity, and a second entity or a second attribute of the second entity, the entities or attributes being obtained, derived, or inferred from an input dataset, the rules comprising a first rule for evaluating the first entity or the first attribute and a second rule for evaluating the second entity or the second attribute, the first rule being semantically native to a first data type and the second rule being semantically native to a second data type, the second rule being dynamically changed depending on a first level of conformity of the first entity or the first attribute according to the first rule;
obtaining event data associated with the entities or the attributes, wherein the event data comprises sequences of events associated with the entities or the attributes;
generating a first converted dataset comprising at least a first subset of the event data associated with the first entity or the first attribute, and generating a second converted dataset comprising at least a second subset of the event data associated with the second entity or the second attribute, wherein the first converted dataset has a first format consistent with the first data type and the second converted dataset has a second format consistent with the second data type to expedite evaluation of the rules;
evaluating a first level of conformity or nonconformity of the first converted dataset according to the first rule; and
evaluating a second level of conformity or nonconformity of the second converted dataset according to the second rule;
based on the first and second levels of conformity or nonconformity, determining any level of an alert to be triggered;
selectively triggering the alert based on the determined level of the alert; and
performing a downstream action associated with the determined level of the alert.

2. The computing system of claim 1, wherein the evaluating of the level of conformity or nonconformity is based on one or more access constraints of the entities or attributes from different sections of the database.

3. The computing system of claim 1, wherein the downstream action comprises adjusting a sampling rate of the monitoring based on the determined level of the alert.

4. The computing system of claim 1, wherein the evaluating of the level of conformity or nonconformity is based on a join key, a primary key, or a foreign key constraint associated with the event data.

5. The computing system of claim 1, wherein:
the evaluating of the level of conformity comprises evaluating, using different computing nodes, the respective attributes.

6. The computing system of claim 1, wherein the one or more actions comprise an alert or a notification to an entity that transmitted the monitoring request.

7. The computing system of claim 1, wherein the one or more actions comprise:
writing captured data to a database or an external database.

8. The computing system of claim 1, further comprising the database storing the one or more entities or attributes are obtained, the database being directly integrated with the computing system, and the evaluating of the level of conformity or nonconformity of the event data to the one or more rules, the determining of the any level of the alert to be triggered, and the selectively triggering of the alert, are performed within the database.

9. The computing system of claim 8, wherein the database is directly integrated with the computing system at a back end of the database, wherein the back end corresponds to a data access layer.

10. The computing system of claim 8, wherein the database resides on a database layer, the database layer being a separate layer from a metadata layer that stores relationship data of objects within the database, the relationship data comprising a join key, a primary key, a foreign key constraint, or a different key.

11. The computing system of claim 1, wherein performing a downstream action associated with the determined level of the alert is in response to simulating the downstream action.

12. The computing system of claim 1, wherein evaluating a first level of conformity or nonconformity or evaluating a second level of conformity or nonconformity of the second converted dataset is based on one or more changes of a join key, a primary key, or a foreign key constraint.

13. The computing system of claim 1, wherein evaluating a first level of conformity or nonconformity is performed by a first computing node and evaluating a second level of conformity or nonconformity is based on a second computing node.

14. The computing system of claim 1, wherein performing a downstream action comprises:

determining whether the first level of conformity or nonconformity, or determining whether the second level of conformity or nonconformity causes a trigger condition to be satisfied or unsatisfied;

predicting whether one or more additional changes in the first level of conformity or nonconformity or in the second level of conformity or nonconformity causes the trigger condition to be satisfied or unsatisfied;

in response to the first level of conformity or nonconformity or the second level of conformity or nonconformity causing the trigger condition to be satisfied and the additional changes causing the trigger condition to be unsatisfied, implementing a first action; and in response to the first level of conformity or nonconformity or the second level of conformity or nonconformity causing the trigger condition to be satisfied and the trigger condition remaining satisfied after the additional changes, implementing a second action different from the first action.

15. The computing system of claim 1, wherein performing a downstream action comprises:

determining whether the first level of conformity or nonconformity, or determining whether the second level of conformity or nonconformity causes a trigger condition to be satisfied or unsatisfied;

predicting whether one or more additional changes in the first level of conformity or nonconformity or in the second level of conformity or nonconformity causes the trigger condition to be satisfied or unsatisfied;

in response to the first level of conformity or nonconformity or the second level of conformity or nonconformity causing the trigger condition to be unsatisfied and the additional changes causing the trigger condition to be satisfied, implementing a first action; and in response to the first level of conformity or nonconformity or the second level of conformity or nonconformity causing the trigger condition to be satisfied and the trigger condition remaining satisfied after the additional changes, implementing a second action different from the first action.

16. The computing system of claim 1, wherein the computing system comprises a distributed computing system having a first processor, a second processor and a third processor, wherein the first processor is configured to evaluate the first entity or the first attribute, the second processor is configured to evaluate the second entity or the second attribute, and the third processor is configured to evaluate one or more additional rules with respect to a combination of the first entity or the first attribute, and the second entity or the second attribute.

17. The computing system of claim 1, wherein the evaluating comprises determining an anomaly status in response to determining that a first rate of change or a first variance in the first attribute deviates by more than a threshold amount from a second rate of change or a second variable in the second attribute; and the selectively implementing the one or more actions comprises implementing a first action in response to determining the anomaly status and refraining from implementing the first action in response to determining a non-anomaly status.

18. A computer-implemented method of a computing system, the computer-implemented method comprising:

receiving a monitoring request, wherein the monitoring request comprises entities or attributes, to be monitored, rules to evaluate whether the entities or the attributes are conforming or nonconforming, or a level of conformity, and one or more actions to be selectively triggered based on the evaluation, the entities or attributes comprising a first entity or a first attribute of the first entity, and a second entity or a second attribute of the second entity, the rules comprising a first rule for evaluating the first entity or the first attribute and a second rule for evaluating the second entity or the second attribute, the first rule being semantically native to a first data type and the second rule being semantically native to a second data type, the second rule being dynamically changed depending on a first level of conformity of the first entity or the first attribute according to the first rule;

obtaining event data associated with the entities or the attributes, wherein the event data comprises sequences of events associated with the entities or the attributes;

generating a first converted dataset comprising at least a first subset of the event data associated with the first entity or the first attribute, and generating a second converted dataset comprising at least a second subset of the event data associated with the second entity or the second attribute, wherein the first converted dataset has a first format consistent with the first data type and the second converted dataset has a second format consistent with the second data type to expedite evaluation of the rules;

evaluating a first level of conformity or nonconformity of the first converted dataset according to the first rule; and evaluating a second level of conformity or nonconformity of the second converted dataset according to the second rule;

based on the first and second levels of conformity or nonconformity, determining any level of an alert to be triggered;

selectively triggering the alert based on the determined level of the alert; and performing a downstream action associated with the determined level of the alert.

19. The computer-implemented method of claim 18, wherein the evaluating of the level of conformity or nonconformity is based on one or more access constraints of the entities or attributes from different sections of the database.

20. The computer-implemented method of claim 18, wherein the downstream action comprises adjusting a sampling rate of the monitoring based on the determined level of the alert.

* * * * *